(12) United States Patent
Kim et al.

(10) Patent No.: US 7,984,617 B2
(45) Date of Patent: Jul. 26, 2011

(54) METHOD OF CONTROLLING COMPRESSOR FOR REFRIGERATOR AND APPARATUS THEREOF

(75) Inventors: Do-Hyung Kim, Gyeongsangnam-Do (KR); Young-Kwon Kim, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 10/577,429

(22) PCT Filed: Oct. 29, 2003

(86) PCT No.: PCT/KR03/02296
§ 371 (c)(1),
(2), (4) Date: Apr. 27, 2006

(87) PCT Pub. No.: WO2005/047700
PCT Pub. Date: May 26, 2005

(65) Prior Publication Data
US 2007/0068181 A1   Mar. 29, 2007

(51) Int. Cl.
*F25B 49/00*   (2006.01)
*F25B 13/00*   (2006.01)
(52) U.S. Cl. .......................... 62/228.5; 62/228.4; 62/160
(58) Field of Classification Search .................. 62/228.1, 62/228.5, 160, 228.4
See application file for complete search history.

(56) References Cited

U.S. PATENT DOCUMENTS

| | | | | |
|---|---|---|---|---|
| 2,257,478 A * | 9/1941 | Newton | ........................... | 62/159 |
| 3,059,448 A * | 10/1962 | McGrath | ........................ | 62/203 |
| 3,503,222 A * | 3/1970 | Dinger et al. | ................... | 62/137 |
| 4,044,362 A * | 8/1977 | Greenhut | ...................... | 346/136 |
| 4,151,725 A * | 5/1979 | Kountz et al. | .................. | 62/182 |
| 4,228,846 A * | 10/1980 | Smorol | ......................... | 165/240 |
| 4,236,874 A | 12/1980 | Sisk | | |
| 4,248,053 A * | 2/1981 | Sisk | ............................... | 62/158 |
| 4,505,600 A * | 3/1985 | Suzuki et al. | .................. | 374/170 |
| 4,598,559 A * | 7/1986 | Tomayko et al. | ............. | 62/324.6 |
| 4,689,967 A * | 9/1987 | Han et al. | ........................ | 62/201 |
| 4,783,609 A * | 11/1988 | Sugiyama et al. | ............. | 310/168 |
| 4,796,438 A * | 1/1989 | Sato | ............................... | 62/133 |
| 4,903,502 A * | 2/1990 | Hanson et al. | ............... | 62/228.5 |
| 4,927,594 A * | 5/1990 | Heibel et al. | ................... | 376/258 |
| 5,200,872 A * | 4/1993 | D'Entremont et al. | ......... | 361/25 |
| 5,224,355 A | 7/1993 | So et al. | | |
| 5,285,646 A * | 2/1994 | TaeDuk | ......................... | 62/115 |
| 5,322,424 A * | 6/1994 | Fujio | ............................... | 418/11 |
| 6,217,287 B1 | 4/2001 | Monk et al. | | |
| 6,272,872 B1 * | 8/2001 | Herrick et al. | ............... | 62/228.3 |
| 6,591,621 B2 * | 7/2003 | Loprete et al. | .................. | 62/160 |
| 7,562,536 B2 * | 7/2009 | Harrod et al. | ................ | 62/228.1 |
| 7,612,510 B2 * | 11/2009 | Koehl | ....................... | 318/400.21 |

(Continued)

FOREIGN PATENT DOCUMENTS

| | | |
|---|---|---|
| JP | 2002-162151 | 6/2002 |
| JP | 2002/266772 | 9/2002 |
| JP | 2003-042627 | 2/2003 |

(Continued)

*Primary Examiner* — Ljiljana (Lil) V Ciric
*Assistant Examiner* — Alexis K Cox
(74) *Attorney, Agent, or Firm* — KED & Associates LLP

(57) ABSTRACT

A method of controlling compressor for refrigerator and apparatus thereof are disclosed to control an operation of the compressor by optimum efficiency by changing freezing capacity of the compressor. The apparatus controls a rotation direction of the compressor installed in the refrigerator and changes the freezing capacity of the compressor in accordance with the rotation direction of the compressor, thereby effectively controlling the operation of the compressor.

10 Claims, 17 Drawing Sheets

U.S. PATENT DOCUMENTS

| | | | |
|---|---|---|---|
| 2001/0007194 A1* | 7/2001 | Kimura et al. | 62/228.3 |
| 2001/0013225 A1* | 8/2001 | Ota et al. | 62/228.5 |
| 2003/0143083 A1* | 7/2003 | Hix et al. | 417/221 |
| 2004/0241010 A1* | 12/2004 | Cho et al. | 417/274 |
| 2009/0049849 A1* | 2/2009 | Kim | 62/156 |
| 2009/0113908 A1* | 5/2009 | Hwang et al. | 62/228.1 |

FOREIGN PATENT DOCUMENTS

| | | |
|---|---|---|
| KR | 1999-001980 | 1/1999 |
| KR | 10-2003-0023209 | 3/2003 |
| RU | 2151326 | 6/2000 |
| WO | WO02/097271 | 12/2002 |

* cited by examiner

METHOD OF CONTROLLING COMPRESSOR FOR REFRIGERATOR AND APPARATUS THEREOF

TECHNICAL FIELD

The present invention relates to a refrigerator and, more particularly, to method and apparatus for controlling an operation of a compressor of a refrigerator.

BACKGROUND ART

In general, a freezing/refrigerating device controls external and internal temperature by controlling a high temperature high pressure refrigerant circulating in a refrigerating cycle. The freezing/refrigerating device includes a refrigerator, an air-conditioner, or the like.

A conventional refrigerator will now be described with reference to FIG. 1

FIG. 1 shows the construction of a refrigerating cycle of a refrigerator in accordance with a conventional art.

As shown in FIG. 1, the refrigerating cycle of a conventional refrigerator includes: a compressor 11 for compressing a refrigerant; a condenser 12 for releasing heat of the refrigerant which has been compressed in the compressor 11; a dryer 13 installed at the condenser 12 and removing moisture of the refrigerant; a solenoid valve 14 connected to a refrigerant pipe connected to the dryer 13 and to the refrigerant pipe and controlling opening/closing of the refrigerant pipe; an expansion valve 15 connected to the solenoid valve 14 and reducing the pressure of the refrigerant discharged from the solenoid valve 14; and an evaporator 16 connected to the expansion valve 15 and receiving the decompressed refrigerant to generate cooling air for absorbing heat contained in a food item stored in a refrigerating chamber or a freezing chamber.

The evaporator 16 is connected to the compressor 11 through the refrigerating pipe. Namely, the refrigerating cycle of the conventional refrigerator is formed with a flow of the compressor 11→the condenser 12→dryer 13→solenoid valve 14→expansion valve 15→evaporator 16→compressor 11.

The compressor 11, the condenser 12, the dryer 13, the expansion valve 15, the evaporator 16 and the compressor 11 are connected to each other through the refrigerating pipe.

The refrigerating cycle of the conventional refrigerator will now be described.

First, a microcomputer (not shown) with a pre-set temperature senses the temperature of the refrigerating chamber and the freezing chamber of the refrigerator. If the temperature of the refrigerating chamber and the freezing chamber is higher than the pre-set temperature, the microcomputer controls the refrigerating cycle for generating cooling air.

The compressor 11 compresses an introduced refrigerant under the control of the microcomputer to a high temperature and high pressure refrigerant. The refrigerant generated in the compressor 11 is discharged to the condenser 12 through the refrigerant pipe.

The condenser 12 releases heat of the refrigerant introduced from the compressor 11 and then discharges it to the dryer 13.

The dryer 13 removes moisture remaining in the refrigerant that has passed through the condenser 12 and discharges the refrigerant to the expansion valve 15 through the solenoid valve 14.

The expansion valve 15 decompresses the high pressure refrigerant flowing in through the solenoid valve 14 and adjusts the refrigerant flowing at a uniform rate to a state of being easily evaporated and discharges it to the evaporator 16.

The evaporator 16 receives the refrigerant from the expansion valve 15 and supplies cooling air to the freezing chamber and the refrigerating chamber to absorb heat in the freezing chamber and the refrigerating chamber.

Absorbing heat in the freezing chamber, and the refrigerating chamber by the evaporator 16, refrigerant is evaporated. The evaporated refrigerant is introduced again to the compressor 11, thereby forming the refrigerating cycle.

However, the compressor employed for the refrigerating cycle of the conventional refrigerator is rotated (operated) only clockwise to constantly generate a maximum output (a maximum freezing capacity). That is, when a temperature in the refrigerator is stable, a maximum output is not required, but since the compressor is rotated only clockwise to constantly generate the maximum output, power consumption of the refrigerator increases.

DISCLOSURE OF THE INVENTION

Therefore, one object of the present invention is to provide a method and apparatus for controlling an operation of a refrigerator capable of operating a compressor installed in a refrigerator with optimum efficiency by varying cooling capability of the compressor by controlling a rotation direction of the compressor.

Another object of the present invention is to provide a method and apparatus for controlling an operation of a compressor of a refrigerator capable of reducing power consumption of the refrigerator and enhancing freezing/refrigerating efficiency of the refrigerator.

Still another object of the present invention is to provide a method and apparatus for controlling an operation of a refrigerator capable of precisely controlling a temperature of a refrigerator.

To achieve these and other advantages and in accordance with the purpose of the present invention, as embodied and broadly described herein, there is provided a method for controlling an operation of a compressor of a refrigerator including: varying the cooling capacity of a compressor installed in a refrigerator by controlling a rotation direction of the compressor.

To achieve the above objects, there is also provided a method for controlling an operation of a compressor of a refrigerator including: varying a cooling capacity of a compressor installed in a refrigerator by controlling a rotation direction of the compressor according to a load condition of the refrigerator, wherein the cooling capacity of the compressor increases when the compressor is rotated clockwise and decreases when the compressor is rotated counterclockwise.

To achieve the above objects, there is also provided an apparatus for controlling an operation of a compressor of a refrigerator including: a microcomputer for outputting a select signal for selecting a rotation direction of a compressor according to an operation mode of a refrigerator when the operation mode of the refrigerator is selected by a user; an operation frequency converter for converting an operation frequency of a compressor according to a temperature in the refrigerator; and a clockwise/counterclockwise rotation signal generating unit for selecting a rotation direction of the compressor based on the select signal and varying a rotation speed of the rotation direction of the compressor based on the converted operation frequency.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

MODES FOR CARRYING OUT THE PREFERRED EMBODIMENTS

A method and apparatus for controlling an operation of a refrigerator capable of operating a compressor installed in a refrigerator with optimum efficiency by varying a cooling capacity of the compressor by controlling a rotation direction of the compressor, in accordance with preferred embodiments of the present invention will now be described.

Embodiment 1

Figure 1:
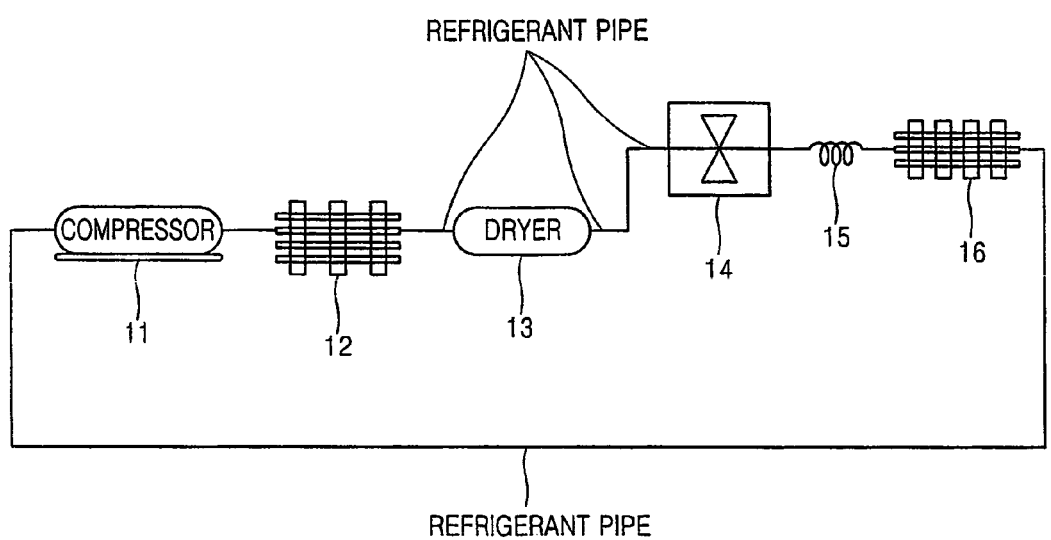
FIG. 1 shows the construction of a refrigerating cycle of a refrigerator in accordance with a conventional art.
Figure 2:
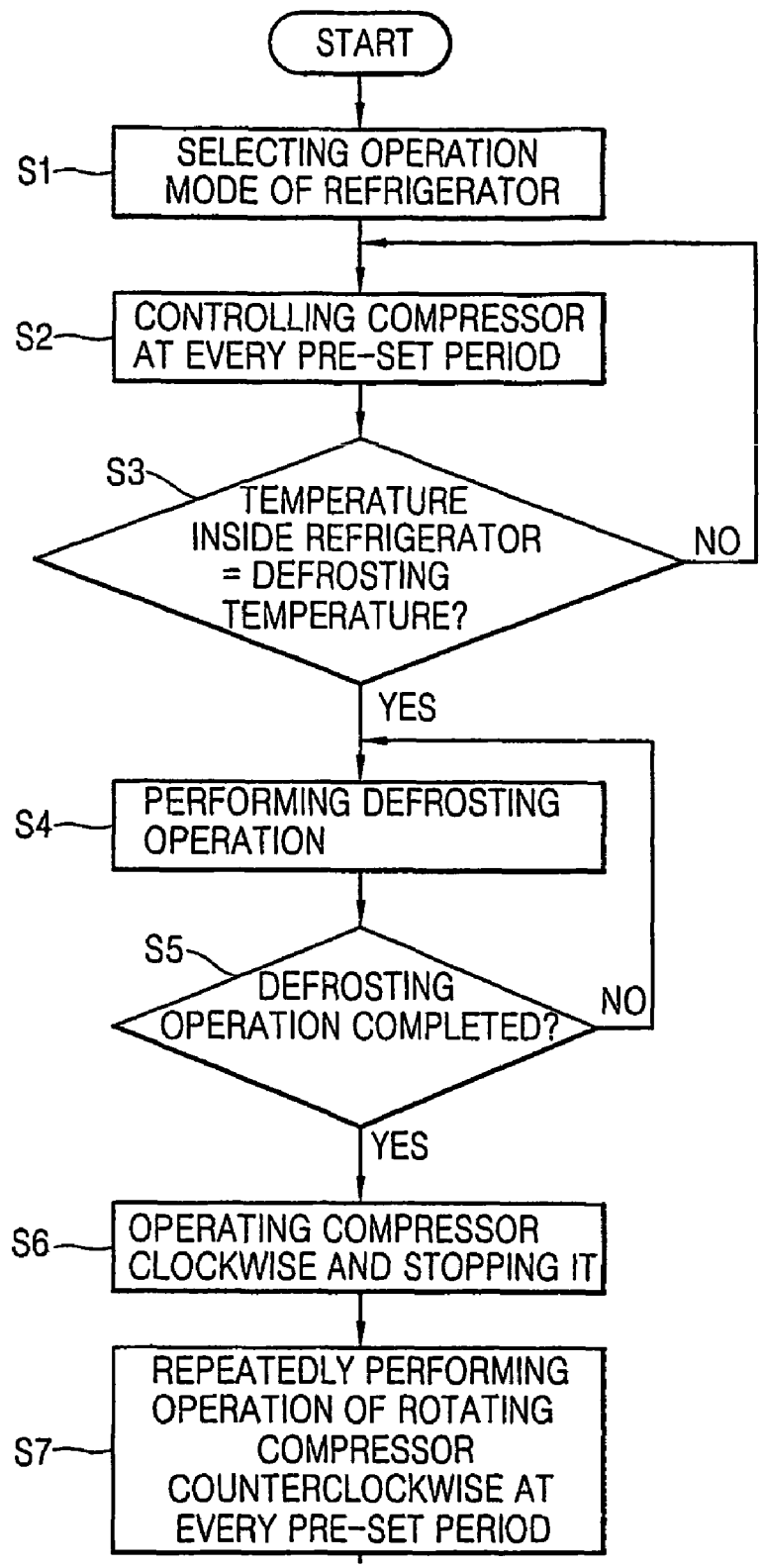
FIG. 2 is a flow chart of a method for controlling an operation of a compressor of a refrigerator in accordance with a first embodiment of the present invention.

FIG. 2 is a flow chart of a method for controlling an operation of a compressor of a refrigerator in accordance with a first embodiment of the present invention.

First, when an operation mode of a refrigerator is selected by a user, a process of rotating a compressor of the refrigerator counterclockwise and stopping it is repeatedly performed. For example, when the operation mode of the refrigerator is selected by the user (step S1), the compressor of the refrigerator is initially rotated clockwise to increase refrigerating capability to quickly lower the temperature inside the refrigerator to a pre-set temperature, and then, the compressor is rotated counterclockwise at every pre-set period in order to maintain the pre-set temperature. In this case, when the compressor is rotated counterclockwise at every pre-set period, the refrigerating capability of the compressor is reduced (step S2). The compressor is a TCM (Two Capacity Modulator) compressor. When the TCM compressor is rotated clockwise, its stroke is lengthened, increasing the refrigerating capability of the compressor, and when the TCM compressor is rotated counterclockwise, its stroke is shortened, reducing the refrigerating capability of the compressor. When the compressor is rotated clockwise, its power consumption is increased, whereas when the compressor is rotated counterclockwise, the power consumption is reduced.

Thereafter, the temperature inside the refrigerator is sensed by a temperature sensor provided in the refrigerator, and if the temperature inside the refrigerator is identical to a pre-set defrost temperature, a defrosting operation is performed (step S3 and S4).

When the defrosting operation is terminated (step S5), the compressor of the refrigerator is rotated clockwise (step S6) to quickly lower the temperature inside the refrigerator that has been raised according to the defrosting operation to the pre-set temperature, and then, the operation of rotating the compressor counterclockwise is repeatedly performed at every pre-set period to maintain the current temperature state inside the refrigerator (step S7).

Namely, in the first embodiment of the present invention, in order to promptly lower the temperature inside the refrigerator that has been raised according to the defrosting operation, the compressor is rotated clockwise to increase the refrigerating capability after termination of the defrosting operation of the refrigerator. When the temperature inside the refrigerator quickly reaches the pre-set temperature because of to the increased refrigerating capability, the compressor is rotated counterclockwise at every pre-set period to maintain the pre-set temperature.

Therefore, in the first embodiment of the present invention, when the temperature inside the refrigerator goes high according to the defrosting operation, the compressor is rotated clockwise after the defrosting operation to supply maximum cooling air in the refrigerator, and then, the compressor is rotated counterclockwise at every pre-set period to quickly lower the temperature inside the refrigerator after the defrosting operation; whereby food items can be prevented from spoiling.

Embodiment 2

A method for controlling an operation of a compressor of a refrigerator in accordance with a second embodiment of the present invention will now be described with reference to FIG. 3.

Figure 3:
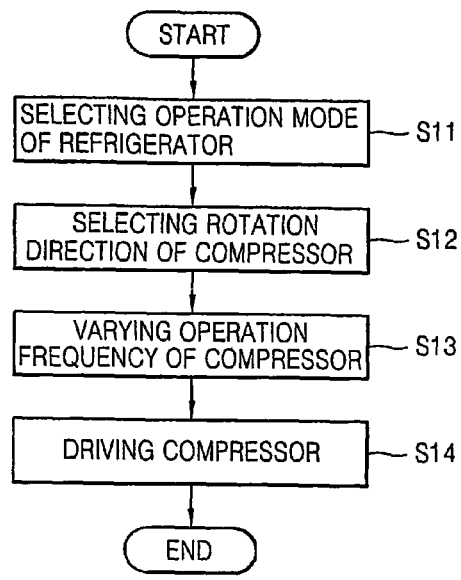
FIG. 3 is a flow chart of a method for controlling an operation of a compressor of a refrigerator in accordance with a second embodiment of the present invention.

FIG. 3 is a flow chart of a method for controlling an operation of a compressor of a refrigerator in accordance with a second embodiment of the present invention.

First, when an operation mode of a refrigerator is selected by a user (step S11), a rotation direction of a compressor is selected according to the pre-set amount of cooling air supply corresponding to the selected operation mode of the refrigerator and an operation frequency of the compressor is converted according to a temperature inside the refrigerator.

For example, when the user sets a quick freezing mode, the amount of cooling air supply in the refrigerator must be maximum. Thus, when the amount of cooling air supply is the maximum, the compressor is rotated clockwise, and when a temperature inside the refrigerator is higher than a pre-set standard temperature (e.g., 4° C.) in the refrigerator, the operation frequency is increased.

Meanwhile, if the user sets a weak freezing mode, the amount of cooling air supply must be the minimum. counterclockwise, and when the temperature inside the refrigerator is equal to or not higher than the pre-set standard temperature, the operation frequency is reduced. Namely, the compressor is rotated clockwise or counterclockwise according to the amount of cooling air supplied to the refrigerator, and at the same time, the rotation speed of each direction of the compressor is controlled based on the varied operation frequency (steps S12-S14). After the rotation direction of the compressor is selected, the rotation speed of the compressor is controlled to supply cooling air into the refrigerator, whereby the temperature inside the refrigerator can be precisely controlled.

An apparatus for controlling the operation of the compressor of the refrigerator in accordance with the second embodiment of the present invention will now be described with reference to FIG. 4.

Figure 4:
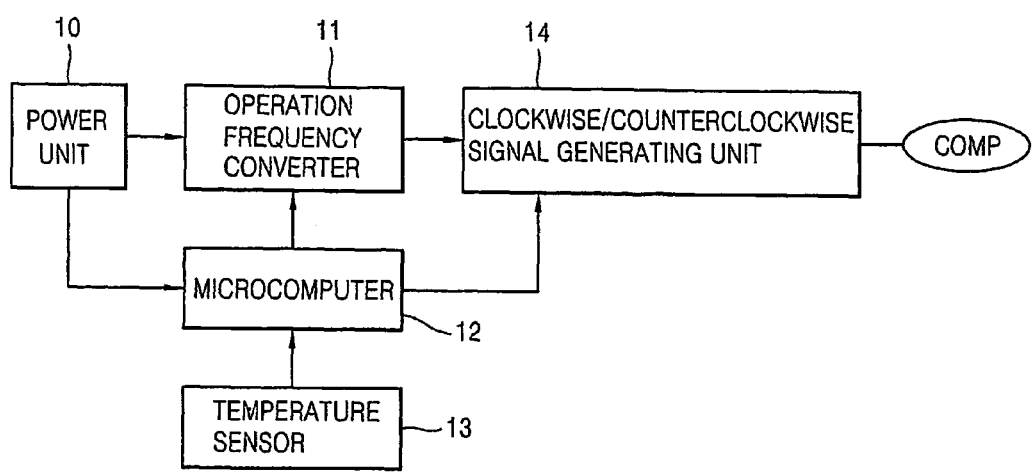
FIG. 4 is a block diagram of an apparatus for controlling an operation of a compressor of a refrigerator in accordance with the second embodiment of the present invention.

FIG. 4 is a block diagram of an apparatus for controlling the operation of the compressor of the refrigerator in accordance with the second embodiment of the present invention.

As shown in FIG. 4, the apparatus for controlling the operation of the compressor of the refrigerator includes: a temperature sensing unit 13 for sensing a temperature inside the refrigerator; a microcomputer 12 for outputting a select signal for selecting a rotation direction of the compressor according to the amount of cooling air supply because of to a selected mode when an operation mode of the refrigerator is selected by a user, and outputting an operation control signal for varying an operation frequency of the compressor according to a temperature inside the refrigerator that has been sensed by the temperature sensing unit 13; an operation frequency converting unit 11 for receiving power outputted from a power unit 10 and for converting an operation frequency of the compressor according to the operation control signal; and a clockwise/counterclockwise rotation signal generating unit 14 for controlling the compressor based on the operation frequency, that has been converted by the operation frequency converting unit 11 and the select signal.

The operation of the apparatus for controlling the operation of the compressor of the refrigerator will be described in detail as follows.

First, when the operation mode of the refrigerator is selected by the user, the microcomputer 12 applies a select signal (rotation direction select signal) to the clockwise/counterclockwise rotation signal generating unit 14 based on the amount of cooling air supply according to the selected operation mode.

For example, when maximum cooling capability (maximum amount of cooling air) is required, the microcomputer outputs an operation control signal for maximizing the rotation speed of the compressor to the operation frequency converter 11 and a clockwise select signal for rotating the compressor clockwise to the clockwise/counterclockwise rotation signal generating unit 14.

Meanwhile, if minimum cooling capability is required, the microcomputer 12 outputs an operation control signal for minimizing the rotation speed of the compressor to the operation frequency converting unit 11 and a counterclockwise select signal for rotating the compressor counterclockwise to the clockwise/counterclockwise rotation signal generating unit 14.

The operation frequency converting unit 11 varies the operation frequency of the compressor in order to vary the rotation speed of the compressor based on the operation control signal and outputs the varied operation frequency to the clockwise/counterclockwise rotation signal generating unit 14.

For example, the operation frequency converting unit 11 increases the operation frequency of the compressor to maximize the rotation speed of the compressor based on the operation control signal for maximizing the rotation speed of the compressor, and outputs the increased operation frequency to the clockwise/counterclockwise rotation signal generating unit 14.

Meanwhile, the operation frequency converting unit 11 reduces the operation frequency of the compressor to minimize the rotation speed of the compressor based on the operation control signal for minimizing the rotation speed of the compressor, and outputs the reduced operation frequency to the clockwise/counterclockwise rotation signal generating unit 14.

The clockwise/counterclockwise rotation signal generating unit 14 drives the compressor based on the operation frequency outputted from the operation frequency converting unit 11 and the select signal for selecting the rotation direction of the compressor.

For example, the clockwise/counterclockwise rotation signal generating unit 14 rotates the compressor clockwise based on the clockwise select signal for rotating the compressor clockwise, and increases the clockwise rotation speed of the compressor based on the increased operation frequency.

Meanwhile, the clockwise/counterclockwise rotation signal generating unit 14 rotates the compressor counterclockwise based on the counterclockwise select signal for rotating the compressor counterclockwise, and reduces the counterclockwise rotation speed of the compressor based on the reduced operation frequency.

Therefore, in the second embodiment of the present invention, by selecting the rotation direction of the compressor according to the operation mode of the refrigerator selected by the user and by converting the operation frequency of the compressor based on the temperature inside the refrigerator, the temperature inside the refrigerator can be precisely controlled.

Embodiment 3

A method for controlling an operation of a compressor of a refrigerator in accordance with a third embodiment of the present invention will be described with reference to FIG. 5.

Figure 5:
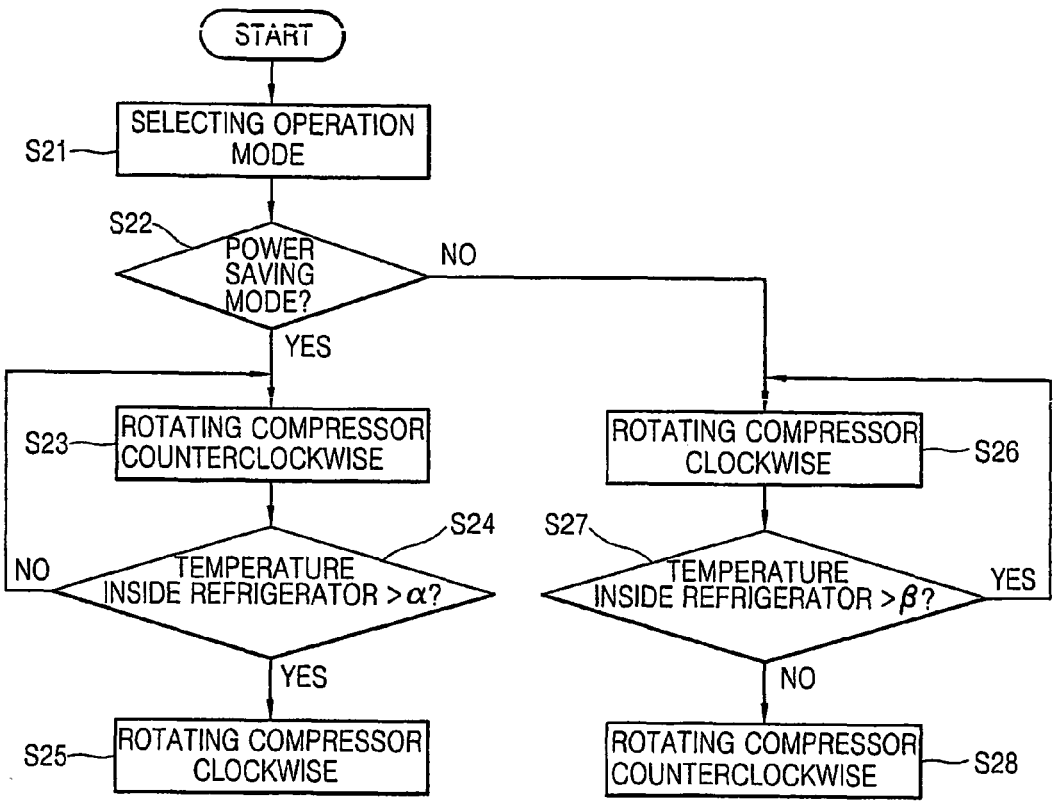
FIG. 5 is a flow chart of a method for controlling an operation of a compressor of a refrigerator in accordance with a third embodiment of the present invention.

FIG. 5 is a flow chart of a method for controlling an operation of a compressor of a refrigerator in accordance with a third embodiment of the present invention.

First, when an-operation mode of a refrigerator is selected by a user (step S21), it is determined whether the selected operation mode is a power saving operation mode (step S22).

If the power saving operation mode is selected by the user, the compressor is rotated counterclockwise (step S23). At this time, if the temperature inside the refrigerator is higher than a pre-set temperature (that is, a temperature which has been previously set by a user, for example 4° C., α), the compressor is rotated clockwise (steps S24 and S25). Namely, when the power saving operation mode is selected by the user, the compressor is driven counterclockwise to reduce power consumption.

Meanwhile, when a standard operation mode, not the power saving mode, is selected by the user, the compressor is rotated clockwise (step S26). In this case, if the temperature inside the refrigerator becomes lower than a pre-set temperature (.beta.), the compressor is rotated counterclockwise (steps S27 and S28).

An apparatus for controlling the operation of the compressor of the refrigerator in accordance with the third embodiment of the present invention will now be described with reference to FIG. 6.

Figure 6:
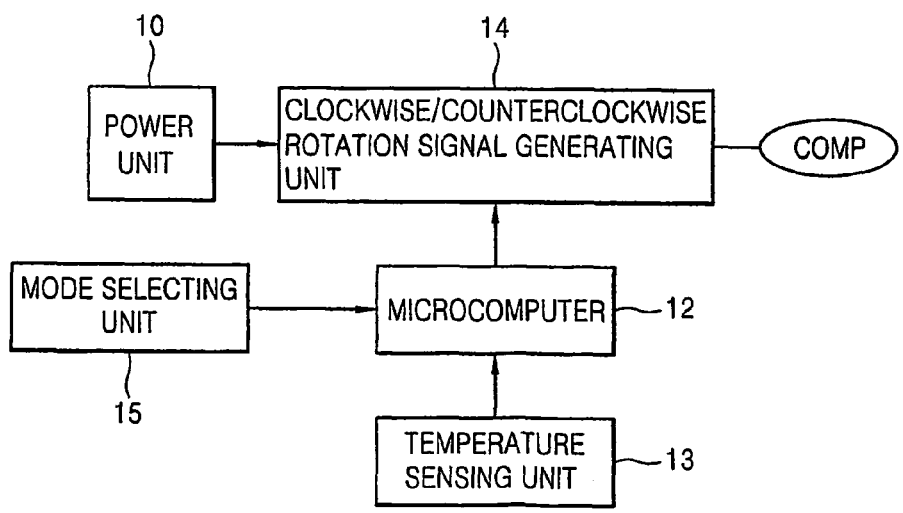
FIG. 6 is a block diagram of an apparatus for controlling an operation of a compressor of a refrigerator in accordance with the third embodiment of the present invention.

FIG. 6 is a block diagram of an apparatus for controlling the operation of the compressor of the refrigerator in accordance with the third embodiment of the present invention.

As shown in FIG. 6, the apparatus for controlling the operation of the compressor of the refrigerator in accordance with the third embodiment of the present invention includes: a mode selecting unit 15 for selecting a power saving operation mode or a standard operation mode according to a user's request and outputting a mode select signal corresponding to the selected mode; a temperature sensing unit 13 for sensing a temperature inside the refrigerator; a microcomputer 12 for outputting an operation control signal for controlling the rotation direction of the compressor based on the mode select signal and the temperature sense signal of the mode selecting unit 15; and a clockwise/counterclockwise rotation signal generating unit 14 for receiving power outputted from a power unit 10 and for rotating the compressor clockwise or counterclockwise according to the cooperation control signal.

The operation of the apparatus for controlling the operation of the compressor of the refrigerator in accordance with the third embodiment of the present invention will be described in detail as follows.

First, when the user selects the power saving operation mode by the user, the mode selecting unit 15 applies a mode select signal corresponding to the power saving operation mode to the microcomputer 12.

The microcomputer 12 applies an operation control signal for controlling the compressor in a power saving mode to the clockwise/counterclockwise rotation signal generating unit 14 according to the mode select signal outputted from the mode selecting unit 15.

The clockwise/counterclockwise rotation signal generating unit 14 generates a counterclockwise signal for rotating the compressor counterclockwise according to the operation control signal of the microcomputer 12. Then, the compressor is rotated counterclockwise according to the counterclockwise signal and supplies a small amount of cooling air into the refrigerator. At this time, the temperature sensing unit 12 senses a temperature inside the refrigerator and applies a temperature sense signal corresponding to the sensed temperature to the microcomputer 12.

The microcomputer 12 compares the sensed temperature with the pre-set temperature (α), and if the sensed temperature is higher than the pre-set temperature (α), the microcomputer 12 applies an operation control signal for rotating the compressor clockwise to the clockwise/counterclockwise rotation signal generating unit 14.

The clockwise/counterclockwise rotation signal generating unit 14 generates a clockwise signal for rotating the compressor clockwise according to the operation control signal, and the compressor is rotated clockwise by the clockwise signal.

While the compressor is being driven clockwise, the temperature inside the refrigerator is sensed, and if the temperature inside the refrigerator is lower than the pre-set temperature (that is, a temperature which has been previously set by a user, for example 6°, β), the compressor is rotated counterclockwise.

Therefore, in the third embodiment of the present invention, when the power saving operation mode is selected by the user, the compressor is rotated counterclockwise, and thus, power consumption can be reduced.

Embodiment 4

A method for controlling an operation of a compressor of a refrigerator in accordance with a fourth embodiment of the present invention will now be described with reference to FIG. 7.

Figure 7:
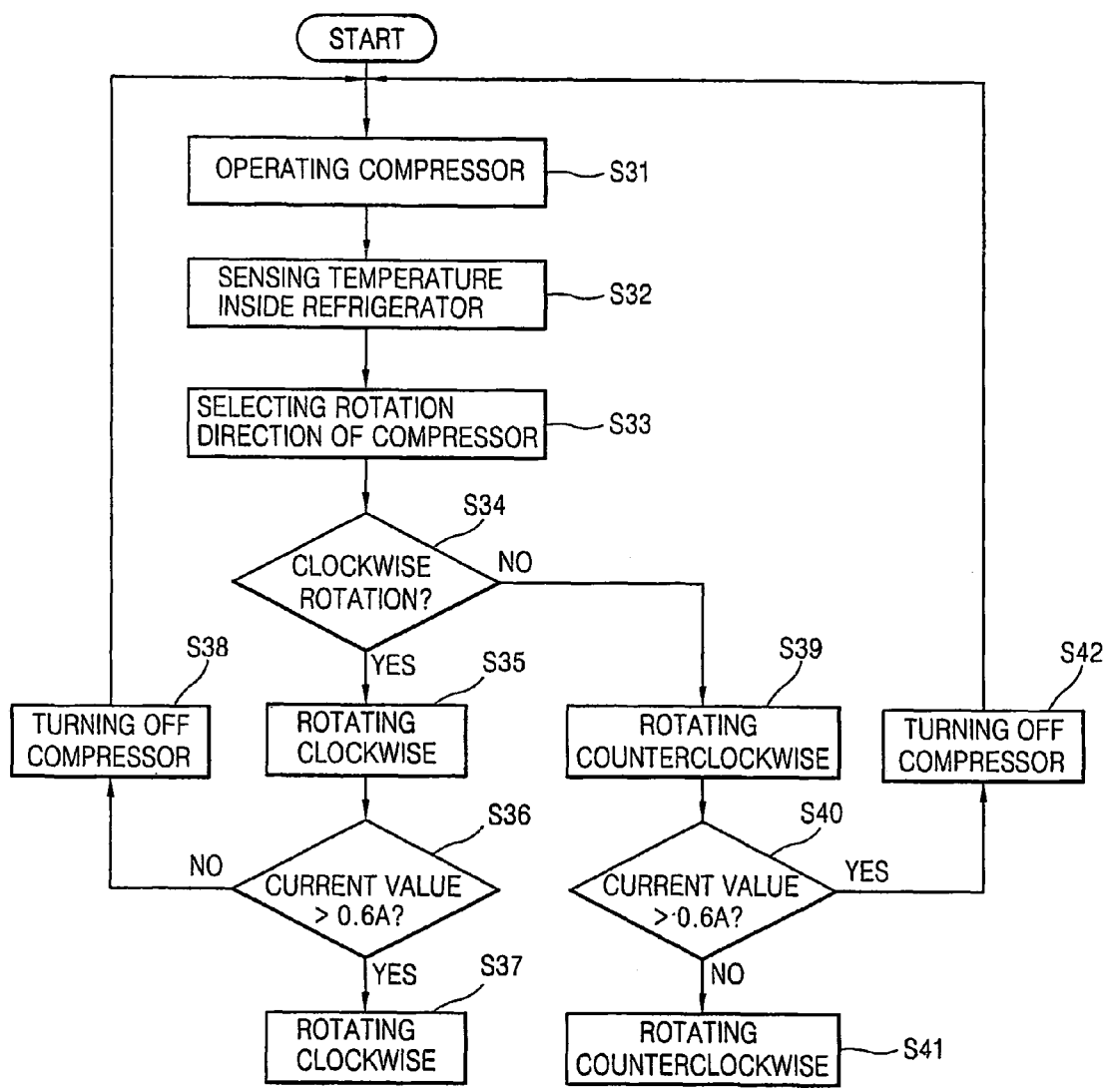
FIG. 7 is a flow chart of a method for controlling an operation of a compressor of a refrigerator in accordance with a fourth embodiment of the present invention.

FIG. 7 is a flow chart of a method for controlling an operation of a compressor of a refrigerator in accordance with a fourth embodiment of the present invention.

First, when an operation mode of a refrigerator is selected by a user, a compressor of the refrigerator is operated (step S31), a temperature inside the refrigerator is sensed (step S32), and then, a rotation direction of the compressor is selected according to the sensed temperature inside the refrigerator (step S33).

For example, if the sensed temperature inside the refrigerator is not lower than a pre-set standard temperature (e.g., 4° C.), the compressor is rotated clockwise, and if the sensed temperature is lower than the pre-set temperature (e.g., 4° C.), the compressor is rotated counterclockwise.

When the compressor is rotated clockwise, a value of a current applied to the compressor is detected and compared with a pre-set reference current value (steps S34~S36). By comparing the value of the current applied to the compressor with the pre-set reference current value, a rotation direction of the compressor can be detected.

If the detected current value is greater than the reference current value (e.g., 0.6 A), it means that there is no error in the rotation direction of the compressor. Thus, when the compressor is rotated clockwise, if the detected current value is greater than the reference current value, the compressor is continuously rotated clockwise (step S37).

If the detected current value is smaller than the reference current value, it means that there is an error in the rotation direction. Thus, if the detected current value is smaller than the reference current value, the compressor is turned off and the process returns to the step S31 of operating the compressor (step S38).

Meanwhile, when the compressor is rotated counterclockwise, a value of a current applied to the compressor is detected and compared with a reference current value (steps S39 and S40).

If the detected current value is smaller than the reference current value, it means that there is no error in the rotation direction of the compressor. When the compressor is rotated counterclockwise, if the detected current value is smaller than the reference current value, the compressor is continuously rotated counterclockwise (step S41).

If, however, the detected current value is greater than the reference current value, it means that there is an error in the rotation direction of the compressor. When the compressor is rotated counterclockwise, if the detected current value is greater than the reference current value, the compressor is turned off and the process returns to the step S31 of operating the compressor (step S42).

Accordingly, in the fourth embodiment of the present invention, when the compressor is operated by determining the rotation direction of the compressor according to the temperature inside the refrigerator or according to the operation mode of the refrigerator, whether or not the compressor is normally operated according to the determined rotation direction is determined according to the value of the current applied to the compressor and the reference current value, whereby the compressor can be normally operated without an error.

For example, if the compressor is to be rotated clockwise but it is rotated counterclockwise because of an error generated at the compressor, an actual rotation direction of the compressor is accurately detected based on the value of the current applied to the compressor in order to normally operate the compressor.

Figure 8:
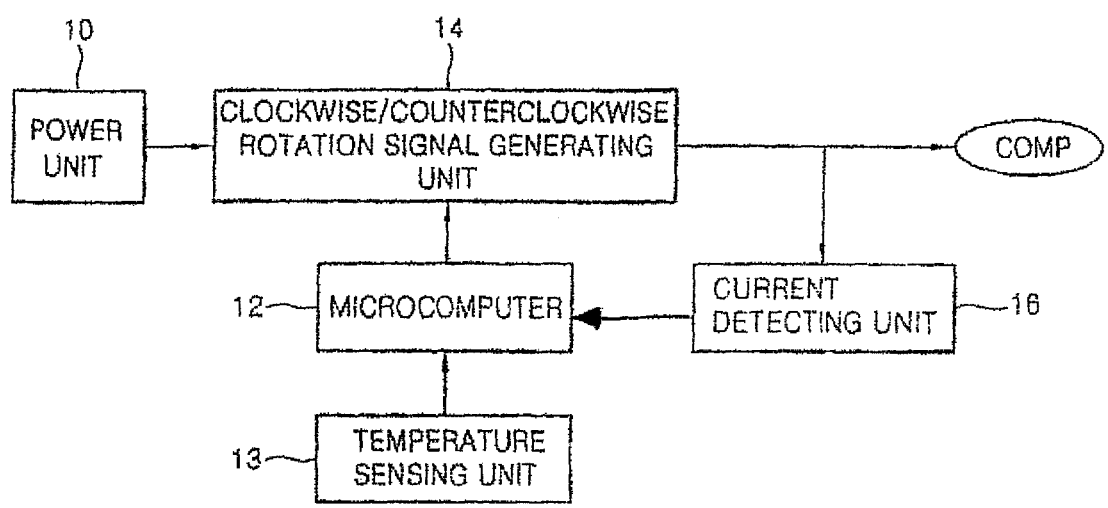
FIG. 8 is a block diagram of an apparatus for controlling an operation of a compressor of a refrigerator in accordance with the fourth embodiment of the present invention.

FIG. 8 is a block diagram of an apparatus for controlling an operation of a compressor of a refrigerator in accordance with the fourth embodiment of the present invention.

As shown in FIG. 8, the apparatus for controlling the operation of the compressor of the refrigerator in accordance with the fourth embodiment of the present invention includes: a current detecting unit 16 for detecting a current applied to the compressor (COMP); a temperature sensing unit 13 for sensing a temperature inside a refrigerator; a microcomputer 12 for outputting a compressor operation control signal according to the temperature inside the refrigerator detected by the temperature sensing unit 13, comparing the current value which has been detected by the current detecting unit 16 and a reference current value, and outputting an operation control signal for controlling the compressor; and a clockwise/counterclockwise rotation signal generating unit 14 for generating a clockwise signal or a counterclockwise signal according to the operation control signal of the microcomputer 12 and applying it to the compressor.

First, when an operation mode of the refrigerator is selected by a user, the microcomputer 12 operates the compressor of the refrigerator. Then, the temperature sensing unit 13 senses a temperature inside the refrigerator and applies a temperature sense signal corresponding to the sensed temperature to the microcomputer 12.

If the sensed temperature inside the refrigerator is higher than a pre-set standard temperature, the microcomputer 12 outputs an operation control signal for rotating the compressor clockwise to the clockwise/counterclockwise rotation signal generating unit 11. If the sensed temperature inside the refrigerator is lower than the pre-set standard temperature, the microcomputer 12 outputs an operation control signal for rotating the compressor counterclockwise to the clockwise/counterclockwise rotation signal generating unit 11.

The clockwise/counterclockwise rotation signal generating unit 11 rotates the compressor clockwise or counterclockwise according to the operation control signal of the microcomputer 14. Then, the current detecting unit 16 detects the current applied to the compressor and applies the detected current value to the microcomputer 12.

The microcomputer 14 detects whether an error occurs in the rotation direction of the compressor by comparing the detected current value with the reference current value, and continuously rotates the compressor in the current rotation direction or turns off the compressor In this case, preferably, the reference current value is set as 0.6 A. For example, when the compressor is actually rotated counterclockwise, the detected current value is smaller than the reference current value. When the compressor is actually rotated clockwise, the detected current value is greater than the reference current value.

Therefore, in the fourth embodiment of the present invention, by determining whether or not the compressor is precisely operated actually according to the determined rotation direction determined according to the temperature inside the refrigerator by comparing the current value applied to the compressor and the current value previously set in experimentation, degradation of an operation efficiency of the refrigeration caused by malfunction of the compressor can be prevented.

Embodiment 5

A method for controlling an operation of a compressor of a refrigerator in accordance with a fifth embodiment of the present invention will now be described with reference to FIG. 9.

Figure 9:
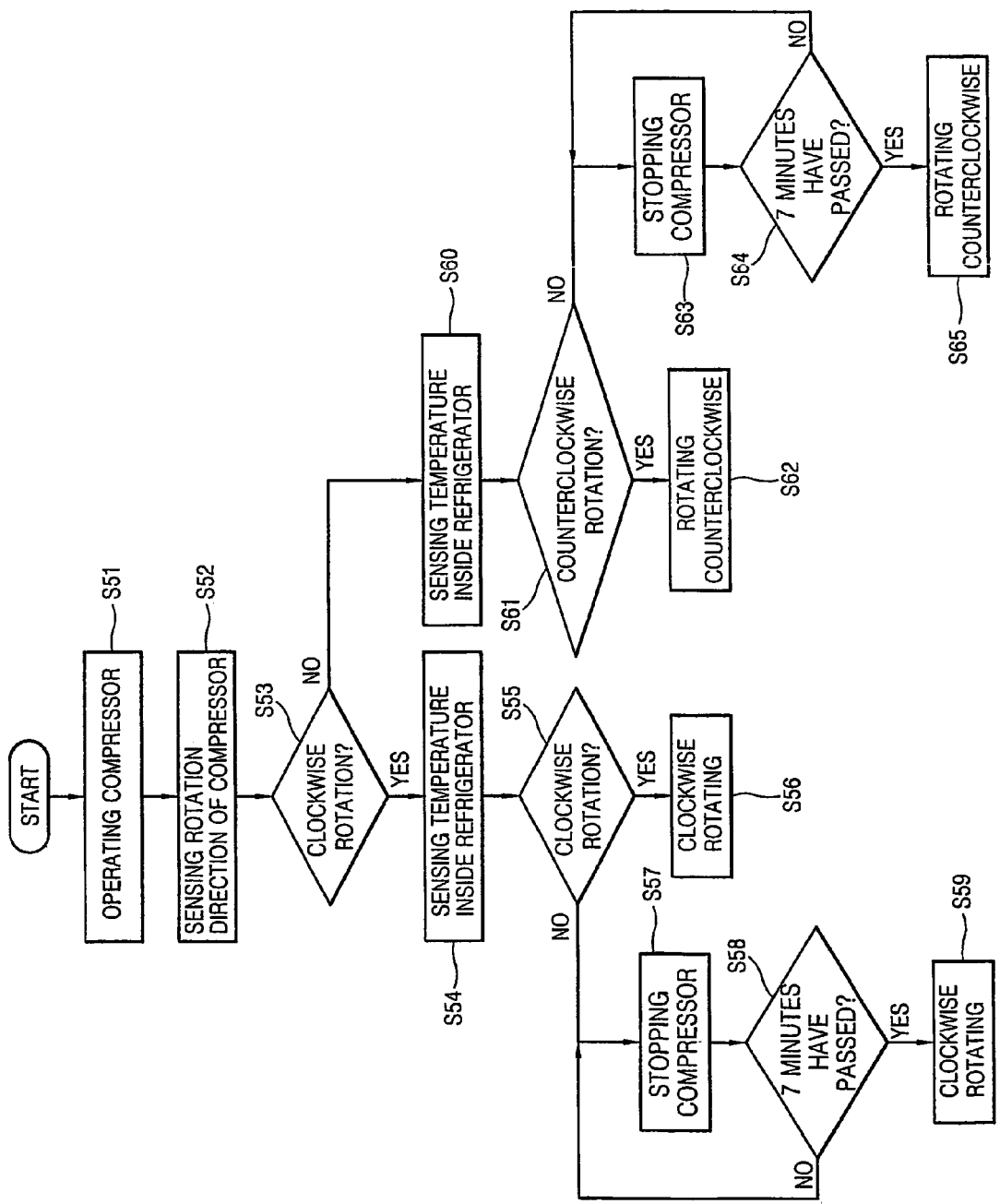
FIG. 9 is a flow chart of a method for controlling an operation of a compressor of a refrigerator in accordance with a fifth embodiment of the present invention.

FIG. 9 is a flow chart of a method for controlling an operation of a compressor of a refrigerator in accordance with a fifth embodiment of the present invention.

First, when a user selects an operation mode of a refrigerator, a compressor of the refrigerator is operated and it is sensed whether a current rotation direction of the compressor is clockwise or counterclockwise (step S51 and S52).

If the current rotation direction of the compressor is clockwise, a temperature inside the refrigerator is sensed (steps S53 and S54), and then, it is determined whether the current rotation direction of the compressor has been selected to be clockwise because the temperature inside the refrigerator is higher than the pre-set temperature (step S55).

According to the determining result (step S55), if the rotation direction of the compressor has been selected clockwise (step S55), the compressor is kept rotating clockwise (step S56).

If, however, the rotation direction of the compressor has been selected to be rotated counterclockwise, the operation of the compressor is stopped for a predetermined time (e.g., seven minutes) (step S57), and then, when the predetermined time (seven minutes) elapses (step S58), the compressor is rotated counterclockwise (step S59).

According to the determining result (step S53), if the rotation direction of the compressor is counterclockwise, the temperature inside the refrigerator is sensed (step S60) and it is determined whether the current rotation direction of the compressor has been selected counterclockwise because the temperature inside the refrigerator is lower than the pre-set temperature (step S61).

According to the determining result (S61), if the rotation direction of the compressor has been selected counterclockwise, the compressor is kept rotating counterclockwise (S62).

If, however, the rotation direction of the compressor has been selected to be clockwise according to the determining result (step S61), the operation of the compressor is stopped for a predetermined time (e.g., seven minutes) (step S63), and then, when the predetermined time (seven minutes) elapses (step S64), the compressor is rotated clockwise (step S65).

Therefore, in the fifth embodiment of the present invention, after the rotation direction of the compressor operating clockwise or counterclockwise is sensed, when the rotation direction of the compressor needs to be changed according to a change in the temperature inside the refrigerator, the operation of the compressor is stopped for a predetermined time and the rotation direction of the compressor is changed and operated, so that reliability of the compressor can be obtained.

Embodiment 6

A method for controlling an operation of the compressor of the refrigerator in accordance with the sixth embodiment of the present invention will be described with reference to FIG. 10.

Figure 10:
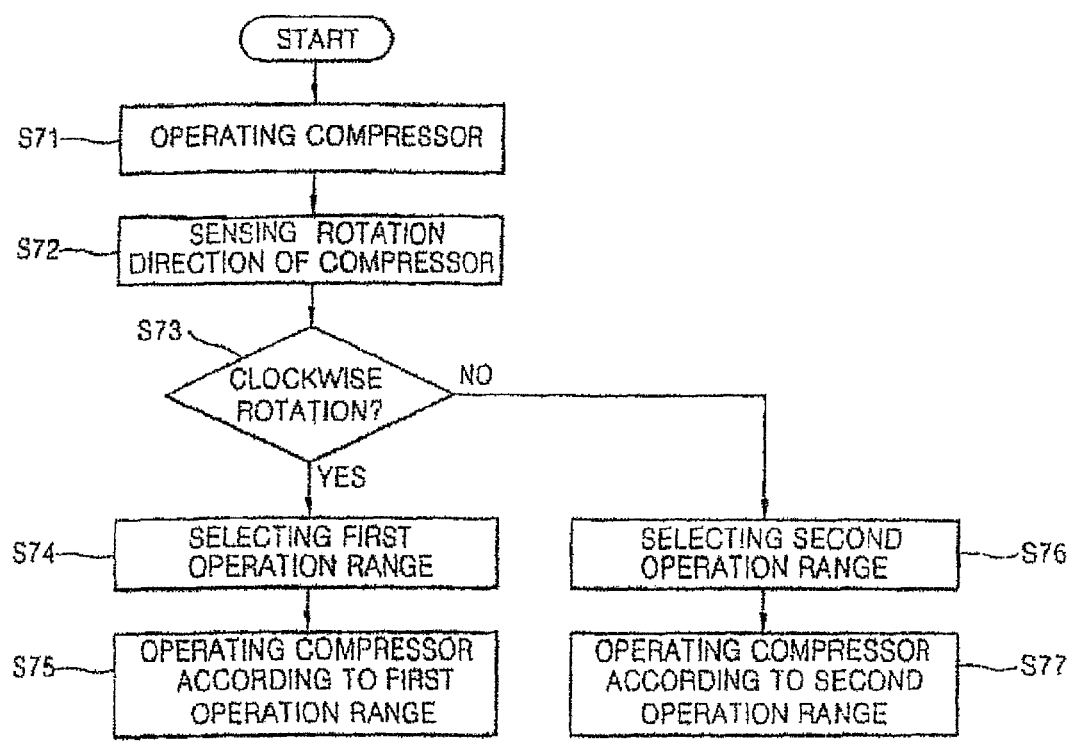
FIG. 10 is a flow chart of a method for controlling an operation of a compressor of a refrigerator in accordance with a sixth embodiment of the present invention.

FIG. 10 is a flow chart of a method for controlling an operation of a compressor of a refrigerator in accordance with a sixth embodiment of the present invention.

First, when an operation mode of a refrigerator is selected by a user, a compressor of the refrigerator is operated (step S71) and it is sensed whether the rotation direction of the compressor is clockwise or counterclockwise (step S72).

According to the sensing result (step S72), if the rotation direction of the compressor is clockwise (step S73), a first operation range of a temperature sensor of the refrigerator is selected (step S74), and a signal for controlling the operation range of the compressor according to the first operation range is also selected (step S75). The first operation range of the temperature sensor of the refrigerator is approximately set −0.5° C.~+0.5° C. according to experimentation.

For example, while the compressor is being rotated clockwise, the temperature sensor is operated only when and a temperature range of the temperature sensor is −0.5° C.~+0.5° C., and outputs a signal for turning on or off the operation of the compressor.

According to the sensing result (step S72), if the rotation direction of the compressor is counterclockwise, a second operation range of the temperature sensor of the refrigerator is selected (step S76) and controls the operation of the compressor according to the second operation range (step S77). The second operation range of the temperature sensor inside the refrigerator is set approximately −0.3° C.~+0.3° C. according to experimentation.

For example, while the compressor is being rotated counterclockwise, the temperature sensor is operated only when the temperature range is −0.3° C.~+0.3° C., and outputs a signal for turning on or off the operation of the compressor.

Therefore, in the sixth embodiment of the present invention, the operation range of the temperature sensor for sensing the temperature inside the refrigerator is set according to the rotation direction of the compressor and a signal for controlling the operation of the compressor is generated according to the set operation range. Accordingly, when the compressor is rotated clockwise or counterclockwise, the number of times of turning on and off the compressor by a difference of cooling capability according to the rotation direction of the compressor can be improved, and because the temperature difference inside the refrigerator is reduced, power consumption can be reduced.

Embodiment 7

A method for controlling an operation of a compressor of a refrigerator in accordance with a seventh embodiment of the present invention will now be described with reference to FIG. 11.

Figure 11:
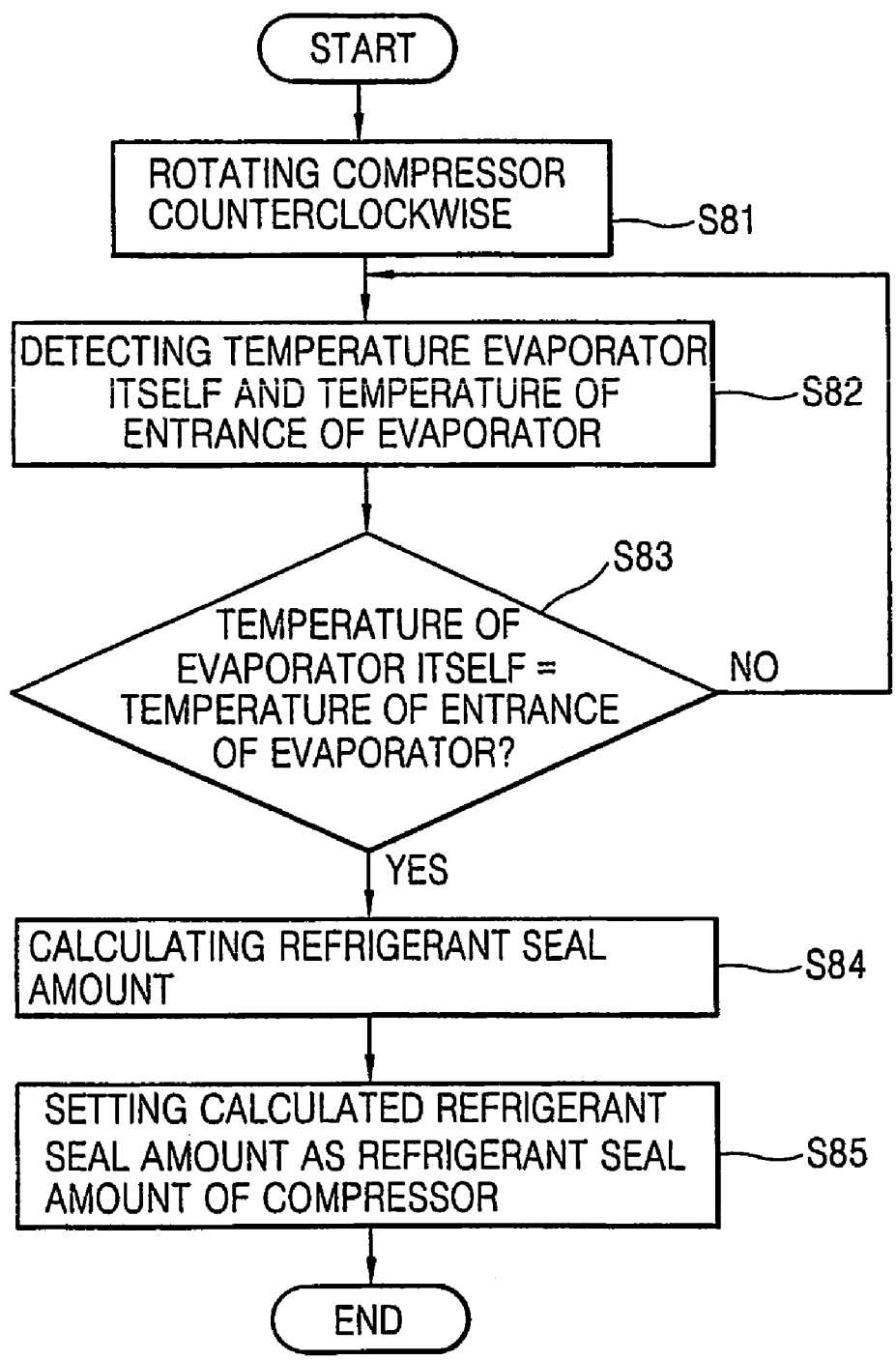
FIG. 11 is a flow chart of a method for controlling an operation of a compressor of a refrigerator in accordance with a seventh embodiment of the present invention.

FIG. 11 is a flow chart of a method for controlling an operation of a compressor of a refrigerator in accordance with a seventh embodiment of the present invention.

First, an operation mode for operating a compressor of a refrigerator counterclockwise is selected by a user and the compressor is rotated counterclockwise (step S81).

When the compressor is rotated counterclockwise a temperature of an evaporator itself and a temperature at an entrance of the evaporator are detected (step S82).

The temperature of the evaporator itself and the temperature at the entrance of the evaporator are compared, and if the former and the latter are equal (step S83), an amount of refrigerant of a refrigerating cycle is calculated from the equal point (step S84) and set as a refrigerant seal amount of the compressor (step S85).

The relationship between the refrigerant seal amount of the refrigerating cycle and the temperature of the evaporator of the refrigerator when the compressor is rotated clockwise, and counterclockwise will be described with reference to FIG. 12 as follows.

Figure 12:
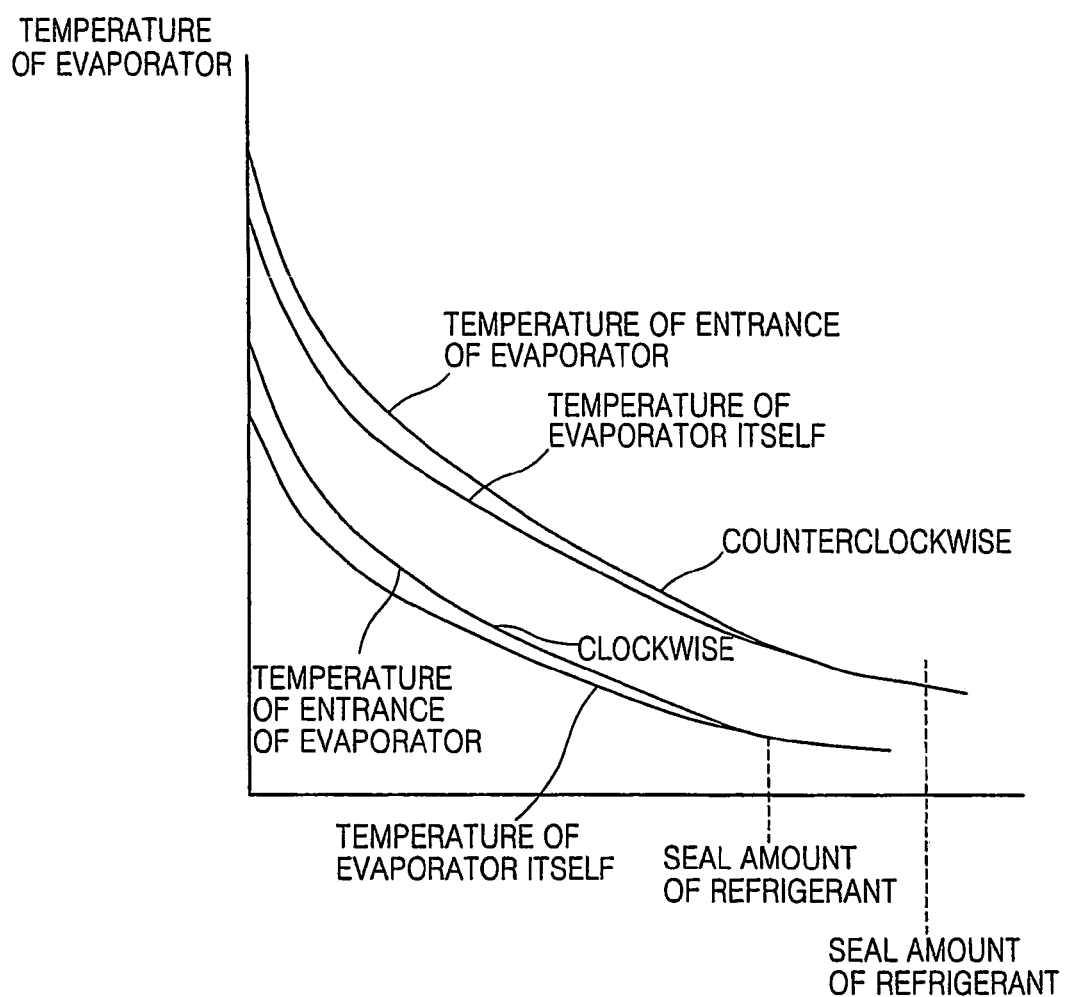
FIG. 12 is a graph showing a relationship between a seal amount of a refrigerant and a temperature of an evaporator of FIG. 11.

FIG. 12 is a graph showing the relationship between the seal amount of a refrigerant and the temperature of the evaporator of FIG. 11.

As shown in FIG. 12, the amount of a refrigerant when the compressor is rotated counterclockwise is greater than the amount of refrigerant when the compressor is rotated clockwise, so the amount of a refrigerant when the compressor is rotated counterclockwise is set as a refrigerant seal amount of the overall refrigerating cycle of the refrigerator.

Therefore, in the seventh embodiment of the present invention, since the amount of a refrigerant when the compressor is rotated counterclockwise is set as the refrigerant seal amount of the overall refrigerating cycle, a refrigerant shortage phenomenon, which can occur when the compressor is rotated clockwise or counterclockwise, can be resolved, and thus, freezing efficiency of the refrigerator can be enhanced, Embodiment 8

A method for con trolling an operation of a compressor of a refrigerator in accordance with an eighth embodiment of the present invention will now be described with reference to FIG. 13.

Figure 13:
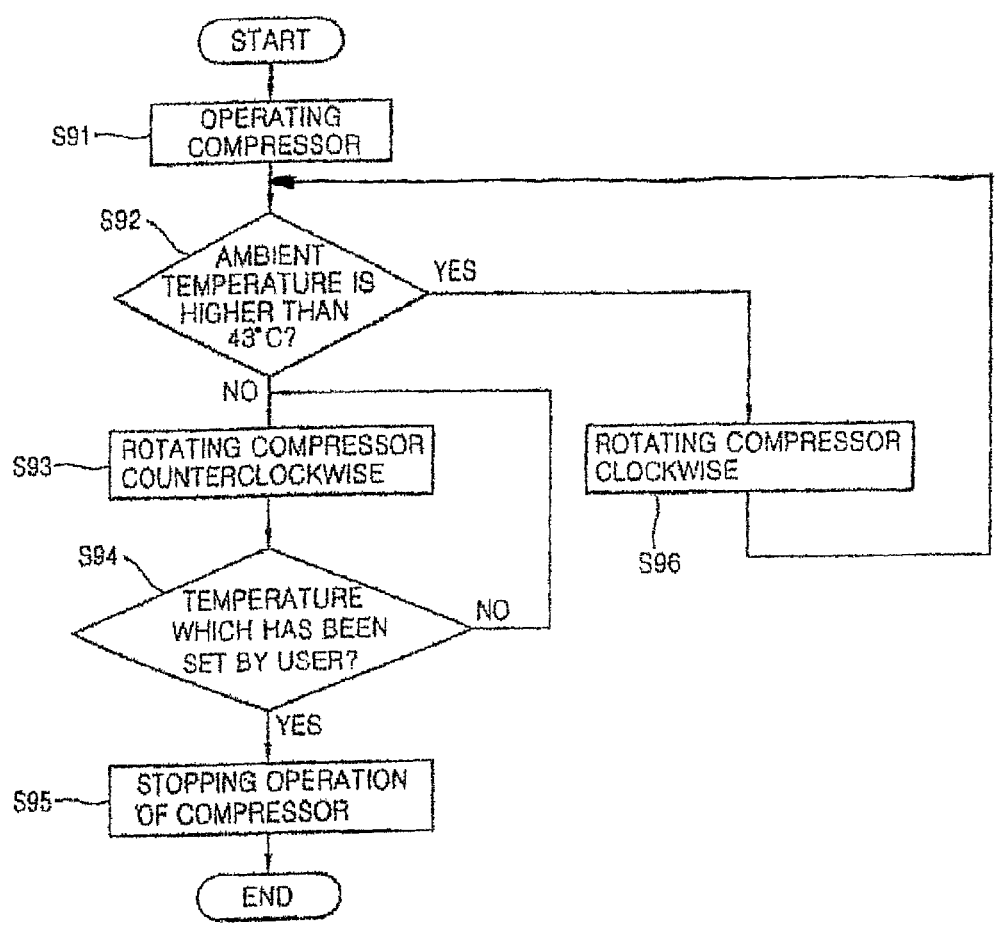
FIG. 13 is a flow chart of a method for controlling an operation of a compressor of a refrigerator in accordance with an eighth embodiment of the present invention.

FIG. 13 is a flow chart of a method for controlling an operation of a compressor of a refrigerator in accordance with an eighth embodiment of the present invention.

First, when an operation mode of a refrigerator is selected by a user, a microcomputer operates a compressor according to the operation mode (step S91). In this case, when an ambient temperature (e.g., a temperature at the exterior rear surface of the refrigerator) sensed by an external temperature sensor of the refrigerator is lower than 43° C., a clockwise/counterclockwise rotation signal generating unit rotates the compressor counterclockwise to reduce cooling capability to maintain a pre-set temperature (e.g., 4° C.) inside the refrigerator (steps S92 and S93).

Meanwhile, when an ambient temperature sensed by the external temperature sensor of the refrigerator is not lower than 43° C., the clockwise/counterclockwise rotation signal generating unit rotates the compressor clockwise to quickly increase cooling capability to maintain the pre-set temperature (e.g., 40° C.) inside the refrigerator, and then the process returns to the step S92 (step S96). Herein, the temperature 43° C. is the ambient temperature of the refrigerator for determining a rotation direction of the compressor, and if the ambient temperature of the refrigerator is not lower than 43° C., the compressor is rotated clockwise, and if the ambient temperature of the refrigerator is lower than 43° C., the compressor is rotated counterclockwise.

Thereafter, when the temperature inside the refrigerator reaches a temperature previously set by the user (step S94), the operation of the compressor is stopped (step S95). If however, the temperature inside the refrigerator does not reach, the pre-set temperature, the process returns to the step S93.

Therefore, in the eighth embodiment of the present invention, when the external temperature of the refrigerator is lower than the pre-set external temperature, the compressor is rotated counterclockwise, and if the external temperature of the refrigerator is not lower than the pre-set temperature, the compressor is rotated clockwise By doing that, the power consumption of the refrigerator can be minimized and the temperature inside the refrigerator can be precisely controlled to the temperature as set by the user.

Embodiment 9

A method for controlling an operation of a compressor of a refrigerator in accordance with a ninth embodiment of the present invention will now be described.

Figure 14:
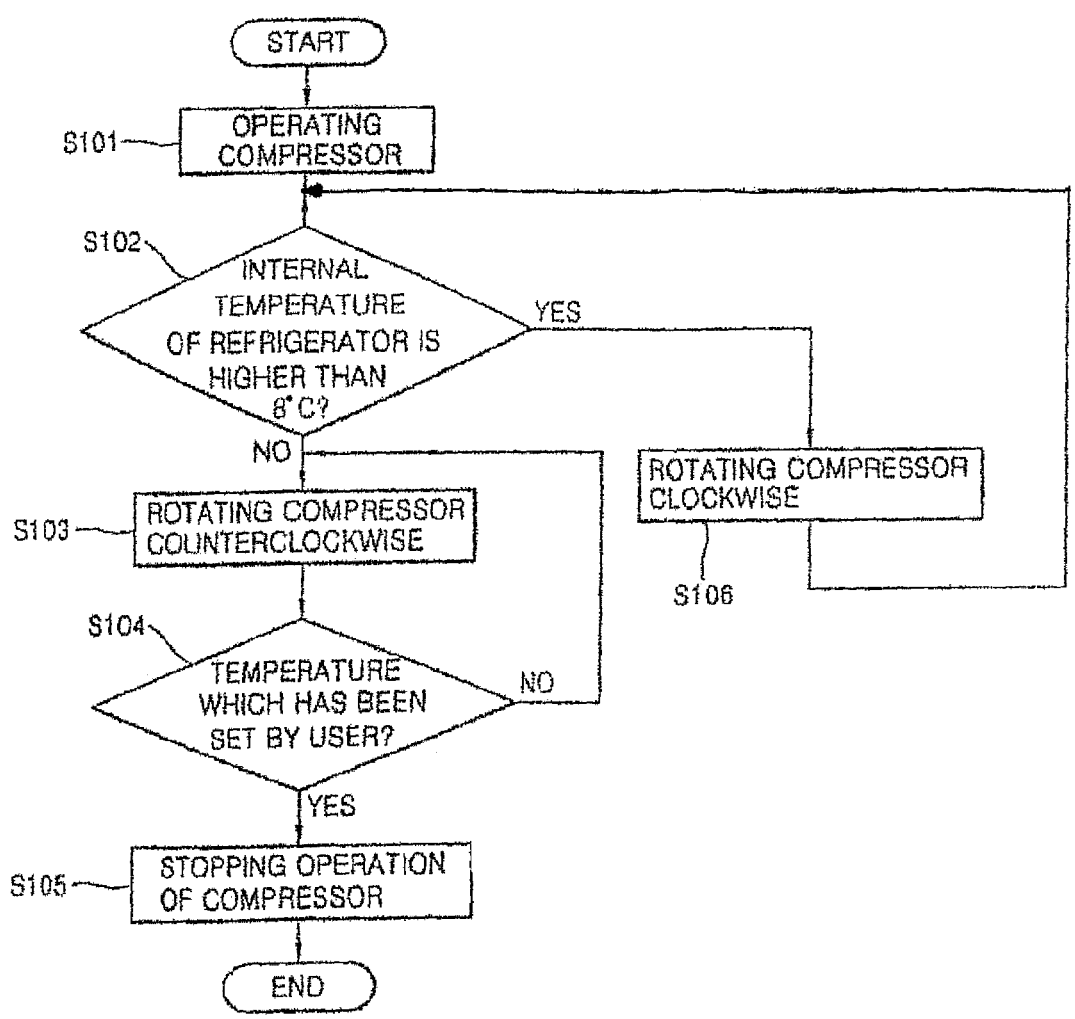
FIG. 14 is a flow chart of a method for controlling an operation of a compressor of a refrigerator in accordance with a ninth embodiment of the present invention.

FIG. 14 is a flow chart of a method for controlling an operation of a compressor of a refrigerator in accordance with a ninth embodiment of the present invention.

First, when an operation mode of a refrigerator is selected by a user, a microcomputer operates a compressor according to the operation mode of the refrigerator (step S101). At this time, if a temperature inside the refrigerator sensed by a temperature sensor is lower than 8° C., a clockwise/counterclockwise rotation signal generating unit rotates the compressor counterclockwise to reduce cooling capability to maintain a pre-set temperature inside the refrigerator (steps S102 and S103).

If however, the temperature inside the refrigerator sensed by a temperature sensor is not lower than 8° C., the clockwise/counterclockwise rotation signal generating unit rotates the compressor clockwise to quickly increase cooling capability to maintain the pre-set temperature (e.g., 4° C.) inside the refrigerator, and then, the process returns to the step S102 (step S106). Herein, the temperature 8° C. is an internal temperature of the refrigerator for determining a rotation direction of the compressor, and when the internal temperature of the refrigerator is not lower than 8° C., the compressor is rotated clockwise, and if the internal temperature of the refrigerator is lower than 8° C., the compressor is rotated counterclockwise.

Thereafter, when the temperature inside the refrigerator reaches a temperature previously set by the user (step S104), the operation of the compressor is stopped (step S105). If, however, the temperature inside the refrigerator does not reach the pre-set temperature, the process returns to the step S103.

Therefore, in the ninth embodiment of the present invention, when the internal temperature of the refrigerator is lower than the pre-set internal temperature (8° C.), the compressor rotates clockwise, whereby power consumption can be minimized and the temperature inside the refrigerator can be precisely controlled to the temperature set by the user.

Embodiment 10

A method for controlling an operation of a compressor of a refrigerator in accordance with a tenth embodiment of the present invention will now be described with reference to FIG. 15.

Figure 15:
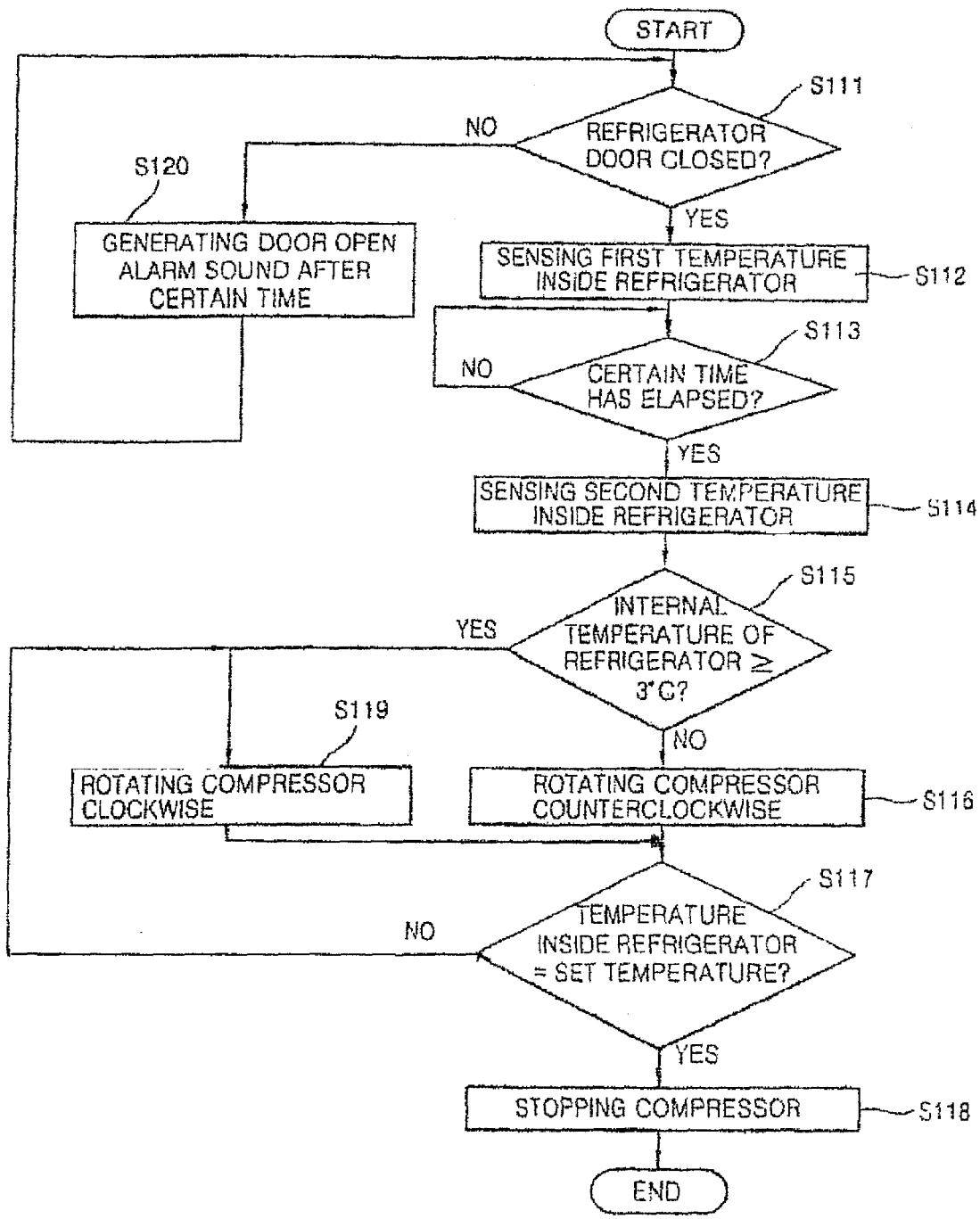
FIG. 15 is a flow chart of a method for controlling an operation of a compressor of a refrigerator in accordance with a tenth embodiment of the present invention.

FIG. 15 is a flow chart of a method for controlling an operation of a compressor of a refrigerator in accordance with a tenth embodiment of the present invention.

First, when a user opens a refrigerator door, puts a food item into the refrigerator and closes the door in order to keep the food item (load) in the refrigerator, a door sensor (not shown) determines whether the refrigerator door is properly closed (step S111).

If the refrigerator door is not closed properly, a door open alarm sound is generated when a predetermined time (e.g., 1-2 minutes) elapses (step S120). When the refrigerator door is properly closed, a first temperature inside the refrigerator is sensed (step S112).

After the first temperature inside the refrigerator is sensed, it is determined whether a predetermined time (e.g., 5 minutes) has elapsed (step S113).

When the predetermined time (e.g., 5 minutes) has elapsed, a second temperature inside the refrigerator is sensed (step S114). The second temperature means a temperature inside the refrigerator with the lapse of the predetermined time after the first temperature is checked.

Thereafter, it is determined whether a difference between the first and second temperatures is the same as or greater than a pre-set reference temperature (e.g., 3° C.) (step S115).

If the difference between the first and second temperatures is the same or greater than 3° C., the compressor is rotated clockwise to supply maximum cooling air into the refrigerator to quickly lower the temperature inside the refrigerator to an internal temperature of the refrigerator previously set by the user (step S119).

Meanwhile, if the difference between the first and second temperatures is not greater than 3° C., the compressor is rotated counterclockwise at every pre-set period to maintain the internal temperature of the refrigerator previously set by the user (step S116).

Thereafter, when the temperature inside the refrigerator and the internal temperature of the refrigerator previously set by the user are identical, the operation of the compressor is stopped. If, however, the temperature inside the refrigerator and the internal temperature of the refrigerator previously set by the user are not identical, the compressor is rotated clockwise to supply the maximum cooling air into the refrigerator to quickly lower the temperature inside the refrigerator to an internal temperature of the refrigerator previously set by the user, and then, when the temperature inside the refrigerator and the internal temperature of the refrigerator previously set by the user are identical, the operation of the compressor is stopped (steps S1I17 and S118).

Therefore, in the tenth embodiment of the present invention, when a load is inputted into the refrigerator, the first temperature inside the refrigerator is sensed simultaneously when the refrigerator door is sensed, and when a predetermined time elapses, the second temperature is sensed. Thereafter, when the difference between the first and second temperatures is the same or greater than a certain temperature (+3° C.), the compressor is rotated clockwise to supply maximum cooling air into the refrigerator to cope with a change of load, so that an optimum temperature state can be maintained.

Embodiment 11

A method for controlling an operation of a compressor of a refrigerator in accordance with an eleventh embodiment of the present invention will now be described with reference to FIG. 16.

Figure 16:
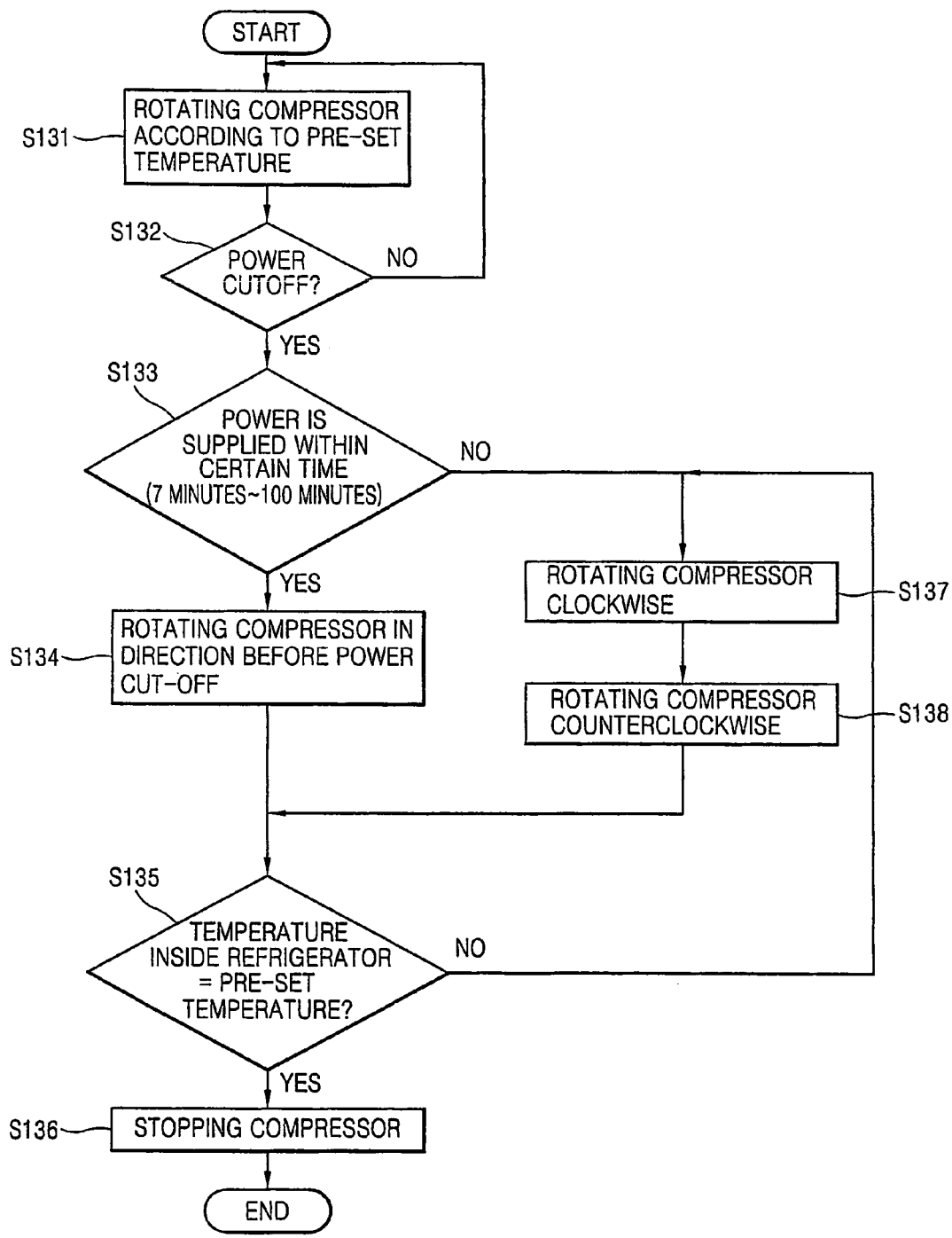
FIG. 16 is a flow chart of a method for controlling an operation of a compressor of a refrigerator in accordance with an eleventh embodiment of the present invention.

FIG. 16 is a flow chart of a method for controlling an operation of a compressor of a refrigerator in accordance with an eleventh embodiment of the present invention.

First, a compressor inside a refrigerator is rotated clockwise or counterclockwise to maintain a temperature previously set by a user inside the refrigerator (step S131). It is sensed whether power supplied to the refrigerator is cut off due to a power failure in real time (step S132).

When power supply into the refrigerator is cut off, it is determined whether power is re-supplied to the refrigerator within a predetermined time (7 minutes~100 minutes) (step S133). For example, when power supply to the refrigerator is cut off due to a power failure, it is determined whether the power cut-off time period is the same or greater than, or lower than the predetermined time (7 minutes~100 minutes).

If power is re-supplied to the refrigerator after the predetermined time elapses, a compressor is rotated clockwise (step S137), and then, the compressor is rotated counterclockwise according to a temperature inside the refrigerator (step S138).

For example, power supply to the refrigerator is cut off due to a power failure, and if the cut-off time exceeds 100 minutes, the compressor is rotated clockwise to supply maximum cooling air into the refrigerator, and then, when the temperature inside the refrigerator reaches a temperature previously set by the user, the compressor is rotated counterclockwise.

If, however, power is re-supplied to the refrigerator within the predetermined time (7 minutes~100 minutes), the compressor is rotated in the same rotation direction of the compressor as the direction before the power was cut off (step S134). Herein, in order to resolve a pressure difference of the compressor, the predetermined time is preferably set within 7 minutes~100 minutes.

Thereafter, it is determined whether the temperature inside the refrigerator is identical to the temperature previously set by the user (step S135). When the temperature inside the refrigerator is identical to the temperature previously set by the user, the operation of the compressor is stopped (step S136).

If, however, the temperature inside the refrigerator is not identical to the temperature previously set by the user, the compressor is rotated clockwise and then counterclockwise to maintain the temperature previously set by the user inside the refrigerator (steps S137 and S138).

Therefore, in the eleventh embodiment of the present invention, when power supplied to the refrigerator is cut off more than a predetermined time and then re-supplied, the compressor is rotated clockwise to supply maximum cooling air into the refrigerator. Or, when power supplied t the refrigerator is cut off within the predetermined time period and then re-supplied, the compressor is rotated in the same direction as the direction before the power is cut off to supply cooling air into the refrigerator. Thus, it can quickly cope with a change of the load of the refrigerator.

Embodiment 12

A method for controlling an operation of a compressor of a refrigerator in accordance with a twelfth embodiment of the present invention will now be described with reference to FIGS. 17, 18A and 18B.

Figure 17:
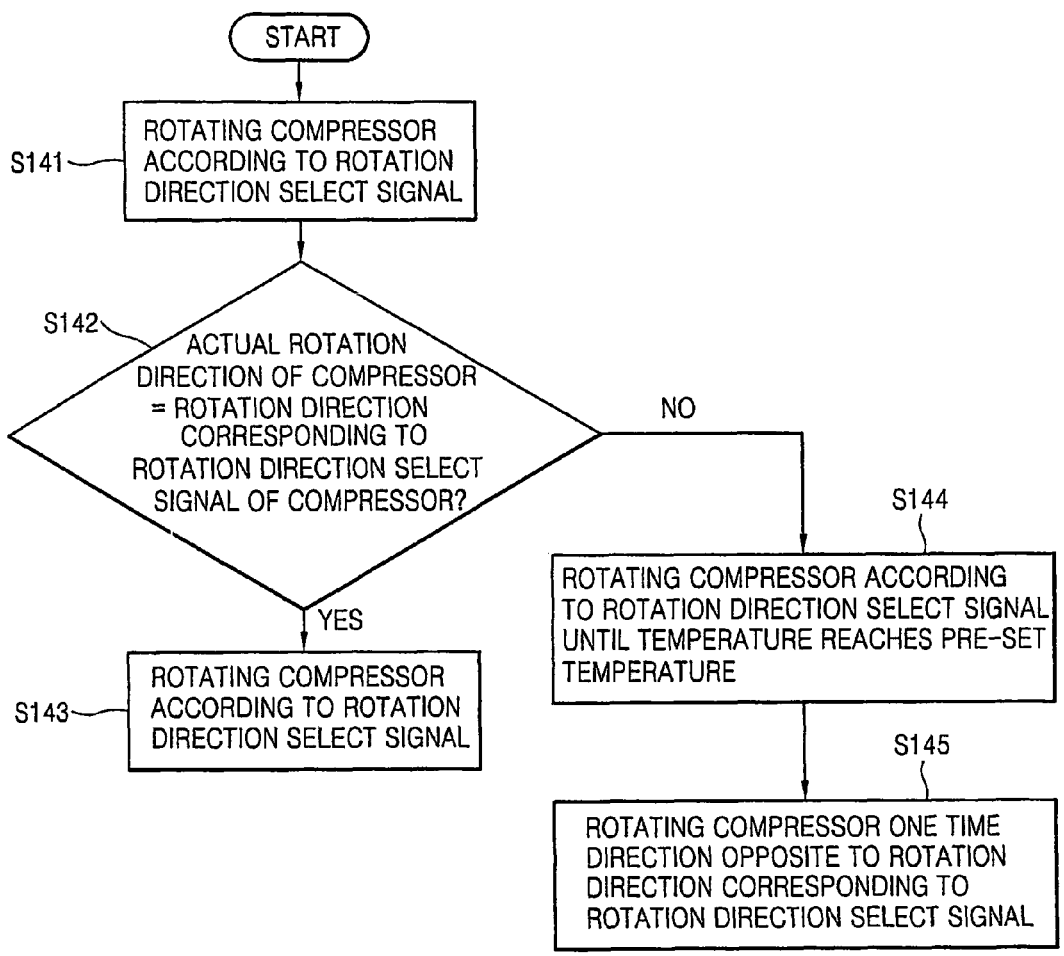
FIG. 17 is a flow chart of a method for controlling an operation of a compressor of a refrigerator in accordance with a twelfth embodiment of the present invention.

FIG. 17 is a flow chart of a method for controlling an operation of a compressor of a refrigerator in accordance with a twelfth embodiment of the present invention.

First, in order to maintain a pre-set temperature inside a refrigerator, a compressor is rotated clockwise to quickly lower an initial temperature inside the refrigerator to the pre-set temperature and then the compressor is rotated counterclockwise to maintain the pre-set temperature (step S141). Herein, the rotation direction of the compressor is determined by a rotation direction select signal. Whether or not the rotation direction of the compressor rotated by the rotation direction select signal and an actual rotation direction of the compressor are identical can be known through a sensor for sensing a rotation direction of the compressor.

The operation of the sensor for sensing the rotation direction of the compressor will be described with reference to FIGS. 18A and 18B as follows.

Figure 18:
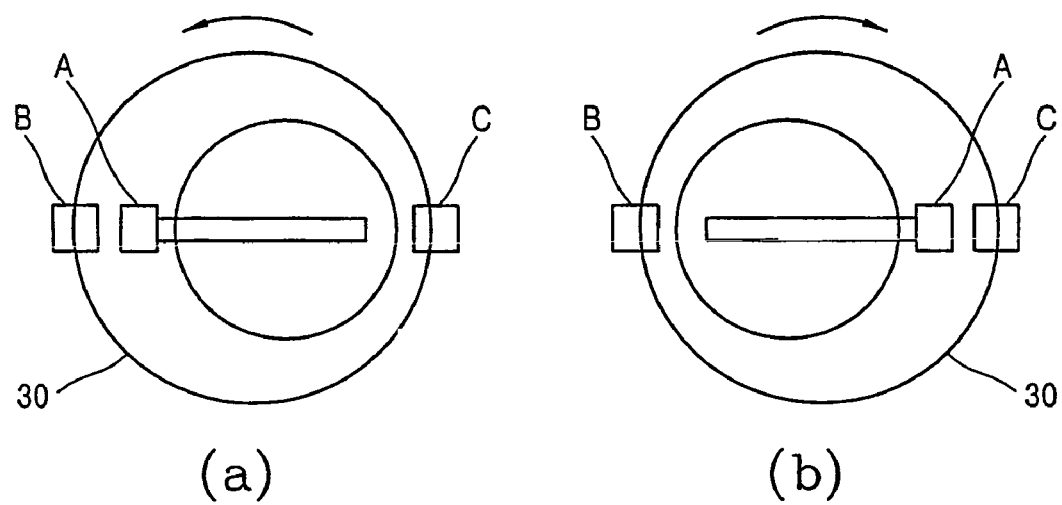
FIGS. 18A and 18B show a sensor for sensing a rotation direction of a compressor rotated clockwise or counterclockwise in accordance with the twelfth embodiment of the present invention.

FIGS. 18A and 18B show a sensor for sensing a, rotation direction of a compressor rotated clockwise or counterclockwise in accordance with the twelfth embodiment of the present invention.

As shown in FIG. 18A, the rotation direction of the compressor rotating clockwise according to the select signal outputted from a clockwise/counterclockwise rotation signal generating unit is sensed by a first rotation direction sensor (A) and a second rotation direction sensor (B).

For example, when the compressor is rotated clockwise according to the clockwise rotation select signal outputted from the clockwise/counterclockwise rotation signal generating unit, the first and second rotation direction sensors installed at the compressor approach each other. Then, the first rotation direction sensor outputs a clockwise sense signal, and a microcomputer recognizes that the rotation direction of the compressor is clockwise based on the clockwise sense signal of the first rotation direction sensor.

With reference to FIG. 18B, the rotation direction of the compressor rotating counterclockwise according to a rotation direction (counterclockwise) select signal outputted from the clockwise/counterclockwise rotation signal generating unit is sensed by the first rotation direction sensor (A) and a third rotation direction sensor (C).

For example, when the compressor is rotated counterclockwise according to the counterclockwise rotation select signal outputted from the clockwise/counterclockwise rotation signal generating unit, the first and third rotation direction sensors installed at the compressor approach each other. Then, the first, rotation direction sensor outputs a counterclockwise sense signal, and the microcomputer recognizes that the rotation direction of the compressor is counterclockwise based on the counterclockwise sense signal of the first rotation direction sensor.

Herein, when the compressor is rotated clockwise, the first and second sensors approach each other, and when the compressor is rotated counterclockwise, the first and third sensors approach each other.

Thereafter, when the rotation direction corresponding to the rotation direction select signal for rotating the compressor 30 and an actual rotation direction of the compressor 30 are identical, the compressor is rotated according to the rotation direction select signal (step S143). Herein, the actual rotation direction of the compressor is sensed by rotation direction sensors installed at the compressor.

If, however, the rotation direction corresponding to the rotation direction select signal for rotating the compressor 30 is not identical to the actual rotation direction of the compressor 30, the compressor is rotated according to the rotation direction select signal until the temperature inside the refrigerator reaches the temperature previously set by the user (step S144).

When the temperature inside the refrigerator reaches the temperature previously set by the user, the compressor is rotated once in a direction opposite to the rotation direction corresponding to the rotation direction select signal of the compressor 30. Namely, by rotating once the compressor in the direction opposite to the rotation direction corresponding to the rotation direction select signal of the compressor 30, an erroneous coupling state of each part of the compressor can be released (step S145).

Thereafter, the compressor is rotated clockwise or. counterclockwise according to the temperature sensed by the temperature sensor in the refrigerator.

Thus, in the twelfth embodiment of the present invention, by detecting whether or not the rotation direction of the rotation direction select signal for rotating the compressor and the actual rotation direction of the compressor are identical, cooling speed inconsistence phenomenon caused by an overshoot owing to spring force and a lubrication friction or centrifugal force or the like among components and a power consumption increase phenomenon caused by a defective cooling speed can be prevented.

Therefore, in the twelfth embodiment of the present invention, whether or not the rotation direction of the compressor according to a rotation direction select signal of the compressor is identical to an actual rotation direction of the compressor is determined, and then, if the rotation direction, corresponding to the rotation direction select signal and the actual rotation direction of the compressor are not identical and it is determined that the compressor is rotated in a different direction due to an erroneous coupling state of parts of the compressor, the current rotation direction of the compressor is maintained until the temperature inside the refrigerator reaches a temperature previously set by the user, and thereafter, when the temperature inside the refrigerator reaches the pre-set temperature, the compressor is rotated one time in a direction opposite to the rotation direction corresponding to the rotation direction select signal of the compressor. By doing that, degradation of efficiency of the refrigerator according to malfunction of the compressor can be prevented and power consumption can be reduced.

Embodiment 13

A method for controlling an operation of a compressor of a refrigerator in accordance with a thirteenth embodiment of the present invention will now be described with reference to FIG. 19.

Figure 19:
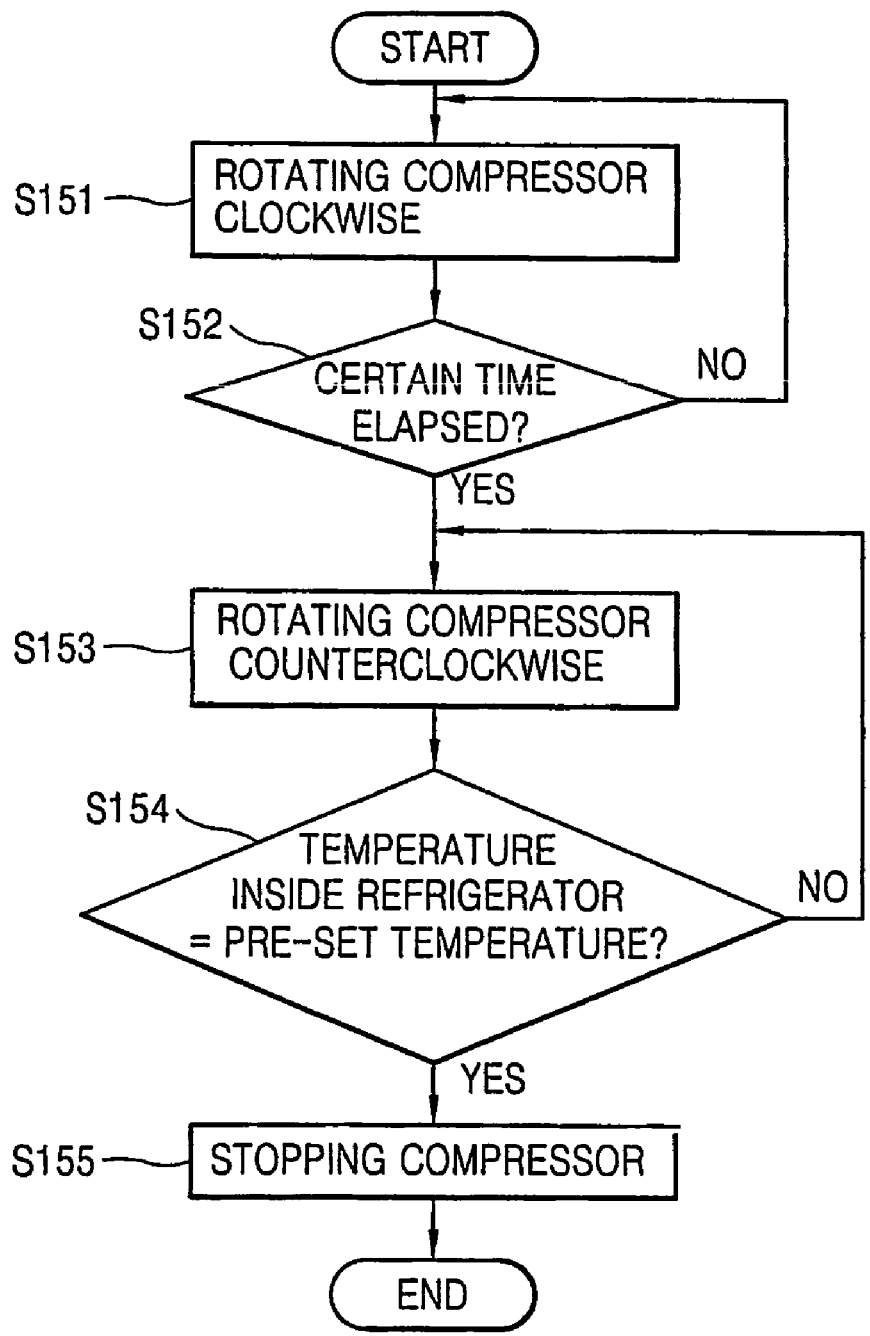
FIG. 19 is a flow chart of a method for controlling an operation of a compressor of a refrigerator in accordance with a thirteenth embodiment of the present invention.

FIG. 19 is a flow chart of a method for controlling an operation of a compressor of a refrigerator in accordance with a thirteenth embodiment of the present invention.

First, when an operation mode of a refrigerator is selected by a user, a compressor of the refrigerator is initially rotated clockwise to increase cooling capability to quickly lower the temperature inside the refrigerator, and then, it is determined whether a pre-set time (e.g., 10 minutes) has elapsed (steps S151 and S152). Herein, when the cooling capability is increased by rotating the compressor clockwise for the pre-set time, the temperature inside the refrigerator quickly reaches near the temperature previously set by the user.

Thereafter, when the pre-set time elapses, the compressor of the refrigerator is rotated counterclockwise to make the temperature inside the refrigerator reach the pre-set temperature. Namely, after the temperature inside the refrigerator quickly reaches near the pre-set temperature by rotating the compressor clockwise during the pre-set time, the compressor is rotated counterclockwise to make the temperature inside the refrigerator gradually reach the temperature previously set by the user, thereby reducing power consumption of the compressor (step S153). Herein, when the pre-set time elapses, maximum cooling capability is not needed, so it is not necessary to waste power by rotating the compressor clockwise after the pre-set time.

After the pre-set time elapses, it is determined whether the temperature inside the refrigerator reaches the temperature previously set by the user (step S154). If the temperature inside the refrigerator reaches the temperature previously set by the user, the operation of the compressor rotating counterclockwise is stopped (step S155).

If, however, the temperature inside the refrigerator does not reach the temperature previously set by the use after the pre-set time elapses, the compressor is rotated counterclockwise at every predetermined period until the temperature inside the refrigerator reaches the temperature previously set by the user.

When the temperature inside the refrigerator is identical to the temperature previously set by the user, the operation of the compressor is stopped. If the temperature inside the refrigerator is not identical to the temperature previously set by the user, the process of rotating the compressor counterclockwise at every certain period is repeatedly performed.

Therefore, in the thirteenth embodiment of the present invention, the compressor of the refrigerator is rotated clockwise for the pre-set time to make the temperature inside the refrigerator quickly reach near the temperature previously set by the user, and then, when the pre-set time elapses, the compressor is rotated counterclockwise to make the temperature inside the refrigerator gradually reach the temperature previously set by the user, thereby reducing power consumption of the compressor.

As so far described, the method and apparatus for controlling an operation of a compressor of a refrigerator in accordance with the present invention have many advantages.

That is, by controlling the rotation direction of the compressor in various manners, power consumption of the refrigerator can be reduced, freezing/refrigerating efficiency of the refrigerator can be enhanced, and the temperature inside the refrigerator can be precisely controlled.

In the first, embodiment of the present invention, when the temperature inside the refrigerator goes high according to the defrosting operation, the compressor is rotated clockwise after the defrosting operation to supply maximum cooling air in the refrigerator, and then, the compressor is rotated counterclockwise at every pre-set period to quickly lower the temperature inside the refrigerator after the defrosting operation, whereby food items can be prevented from spoiling.

In the second embodiment of the present invention, by selecting the rotation direction of the compressor according to the operation mode of the refrigerator selected by the user and by converting the operation frequency of the compressor based on the temperature inside the refrigerator, the temperature inside the refrigerator can be precisely controlled.

In the third embodiment of the present invention, when the power saving operation mode is selected by the user, the compressor is rotated counterclockwise, and thus, power consumption can be reduced.

In the fourth embodiment of the present invention, by determining whether or not the compressor is precisely operated actually according to the determined rotation direction determined according to the temperature inside the refrigerator by comparing the current value applied to the compressor and the current value previously set in experimentation, degradation of an operation efficiency of the refrigeration caused by malfunction of the compressor can be prevented.

In the fifth embodiment of the present invention, after the rotation direction of the compressor operating clockwise or counterclockwise is sensed, when the rotation, direction of the compressor needs to be changed according to a change in the temperature inside the refrigerator, the operation of the compressor is stopped for a predetermined time and the rotation direction of the compressor is changed and operated, so that reliability of the compressor can be obtained.

In the sixth embodiment of the present invention, the operation range of the temperature sensor for sensing the temperature inside the refrigerator is set according to the rotation direction of the compressor and a signal for controlling the operation of the compressor is generated according to the set operation range. Accordingly, when the compressor is rotated clockwise or counterclockwise, the number of times of turning on and off the compressor by a difference of cooling capability according to the rotation direction of the compressor can be improved, and because the temperature difference inside the refrigerator is reduced, power consumption can be reduced.

In the seventh embodiment of the present invention, since the amount of a refrigerant when the compressor is rotated counterclockwise is set as the refrigerant seal amount of the overall refrigerating cycle, a refrigerant shortage phenomenon, which can occur when the compressor is rotated clockwise or counterclockwise, can be resolved, and thus, freezing efficiency of the refrigerator can be enhanced.

In the eighth embodiment of the present invention, when the external temperature of the refrigerator is lower than the pre-set external temperature, the compressor is rotated counterclockwise, and if the external temperature of the refrigerator is not lower than the pre-set temperature, the compressor is rotated clockwise. By doing that, the power consumption of the refrigerator can be minimized and the temperature inside the refrigerator can be precisely controlled to the temperature as set by the user.

In the ninth embodiment of the present invention, when the internal temperature of the refrigerator is lower than the pre-set internal temperature (8° C.), the compressor is rotated clockwise, whereby power consumption can be minimized and the temperature inside the refrigerator can be precisely controlled to the temperature set by the user.

In the tenth embodiment of the present invention, when a load is inputted into the refrigerator, the first temperature inside the refrigerator is sensed simultaneously when the refrigerator door is sensed, and when a predetermined time elapses, the second temperature is sensed. Thereafter, when the difference between the first and second temperatures is the same or greater than a certain temperature (+3° C.), the compressor is rotated clockwise to supply maximum cooling air into the refrigerator to cope with a change of load, so that an optimum temperature state can be maintained.

In the eleventh embodiment of the present invention, when power supplied to the refrigerator is cut off more than a predetermined time and then re-supplied, the compressor is rotated clockwise to supply maximum cooling air into the refrigerator. Or, when power supplied to the refrigerator is cut off within the predetermined time period and then re-supplied, the compressor is rotated in the same direction as the direction before the power is cut off to supply cooling air into the refrigerator. Thus, it can quickly cope with a change of the load of the refrigerator.

In the twelfth embodiment of the present invention, whether or not the rotation direction of the compressor according to a rotation direction select signal of the compressor is identical to an actual rotation direction of the compressor is determined, and then, if the rotation direction corresponding to the rotation direction select signal and the actual rotation direction of the compressor are not identical and it is determined that the compressor is rotated in a different direction due to an erroneous coupling state of parts of the compressor, the current rotation direction of the compressor is maintained until the temperature inside the refrigerator reaches a temperature previously set by the user, and thereafter, when the temperature inside the refrigerator reaches the pre-set temperature, the compressor is rotated one time in a direction opposite to the rotation direction corresponding to the rotation direction select signal of the compressor. By doing that, degradation of efficiency of the refrigerator according to malfunction of the compressor can be prevented and power consumption can be reduced.

In the thirteenth embodiment of the present invention, the compressor of the refrigerator is rotated clockwise for the pre-set time to make the temperature inside the refrigerator quickly reach near the temperature previously set by the user, and then, when the pre-set time elapses, the compressor is rotated counterclockwise to make the temperature inside the refrigerator gradually reach the temperature previously set by the user, thereby reducing power consumption of the compressor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for controlling an operation of a compressor of a refrigerator, the method comprising:
varying a compression capacity of a compressor installed in a refrigerator, wherein the compression capacity of the compressor increases when the compressor is rotated in a first rotation direction with respect to a rotational axis of the compressor and decreases when the compressor is rotated in a second rotation direction that is opposite to the first rotation direction, and
wherein varying the compression capacity comprises:
detecting a current rotation direction of the compressor;
setting an operation range of a temperature sensor that senses a temperature inside the refrigerator according to the detected current rotation direction of the compressor, the operation range of the temperature sensor set to a first temperature range of the refrigerator when the current rotation direction of the compressor is detected to be in the first rotation direction, and the operation range of the temperature sensor set to a second temperature range of the refrigerator different from the first temperature range when the current rotation direction of the compressor is detected to be in the second rotation direction; and
controlling the cooling capacity of the compressor based on whether the temperature inside the refrigerator is detected to be in the first temperature range or the second temperature range, and wherein varying the compression capacity further comprises:

performing a defrosting operation when a temperature inside the refrigerator and a pre-set defrosting temperature are identical;

when the defrosting operation is terminated, rotating the compressor in the first rotation direction, stopping the compressor, and rotating the compressor in the second rotation direction at pre-set time periods;

when an operation mode of the refrigerator is selected by a user, selecting the rotation direction of the compressor according to an amount of cooling air supply corresponding to the selected operation mode, and controlling a rotation speed of the compressor in the selected rotation direction by varying an operation frequency of the compressor based on a temperature inside the refrigerator;

when the operation mode of the refrigerator selected by the user is a power saving operation mode, rotating the compressor in the second rotation direction, and when the temperature inside the refrigerator is higher than a first pre-set temperature, rotating the compressor in the first rotation direction; and when the operation mode of the refrigerator selected by the user is a standard operation mode, rotating the compressor in the first rotation direction, and when the temperature inside the refrigerator reaches a second pre-set temperature, rotating the compressor in the second rotation direction.

2. The method of claim 1, further comprising:

when the compressor is rotated in the first rotation direction according to the operation mode of the refrigerator, detecting a current applied to the compressor, and if the detected current is greater than a pre-set reference current, rotating the compressor continuously in the first rotation direction, and if the detected current is smaller than the reference current, turning off the compressor; and when the compressor is rotated in the second rotation direction according to the operation mode of the refrigerator, detecting a current applied to the compressor, and if the detected current is smaller than the pre-set reference current, rotating the compressor continuously in the second rotation direction, and if the detected current is greater than the pre-set reference current value, turning off the compressor.

3. The method of claim 1, further comprising:

if the rotation direction of the compressor needs to be changed according to a change of a temperature of the refrigerator, stopping the operation of the compressor for a predetermined time period and then changing the rotation direction of the compressor.

4. The method of claim 1, wherein the operation range of the temperature sensor is set to $-0.5°$ C.$\sim+0.5°$ C. when the current rotation range is in the first rotation direction.

5. The method of claim 4, wherein the operation range of the temperature sensor is set to $-0.3°$ C.$\sim+0.3°$ C. when the current rotation range is in the second rotation direction.

6. The method of claim 1, wherein a refrigerant amount of the refrigerating cycle of the refrigerator is set as an amount of a refrigerator of the compressor when the compressor is rotated in the second rotation direction.

7. The method of claim 1, wherein a refrigerant amount of the refrigerating cycle of the refrigerator is calculated when a temperature of an evaporator of the refrigerator and a temperature of an entrance of the evaporator are identical while the compressor is being rotated in the second rotation direction, and the calculated refrigerant amount is set as a refrigerant amount of the compressor.

8. The method of claim 1, wherein the first pre-set temperature and the second pre-set temperature are set by the user.

9. The method claim 8, wherein the first pre-set temperature is $4°$ C.

10. The method of claim 9, wherein the second pre-set temperature is $6°$ C.

* * * * *